United States Patent
Shimizu et al.

(10) Patent No.: US 9,582,162 B2
(45) Date of Patent: Feb. 28, 2017

(54) INFORMATION PROCESSING APPARATUS, INFORMATION PROCESSING SYSTEM, STORAGE MEDIUM AND INFORMATION PROCESSING METHOD

(71) Applicant: NINTENDO CO., LTD., Minami-ku, Kyoto (JP)

(72) Inventors: Daigo Shimizu, Kyoto (JP); Takuhiro Dohta, Kyoto (JP); Daiki Iwamoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 320 days.

(21) Appl. No.: 14/202,662

(22) Filed: Mar. 10, 2014

(65) Prior Publication Data
US 2015/0058759 A1 Feb. 26, 2015

(30) Foreign Application Priority Data

Aug. 21, 2013 (JP) ................................. 2013-171359

(51) Int. Cl.
*G06F 3/00* (2006.01)
*G06F 3/0484* (2013.01)
(Continued)

(52) U.S. Cl.
CPC .......... *G06F 3/04842* (2013.01); *A63F 13/06* (2013.01); *A63F 13/23* (2014.09);
(Continued)

(58) Field of Classification Search
CPC ....................................................... A63F 13/06
(Continued)

(56) References Cited

U.S. PATENT DOCUMENTS 6,001,017 A * 12/1999 Okano .................. A63F 9/0291
273/148 B
7,840,668 B1 * 11/2010 Sylvain .................. A63F 13/12
345/419

(Continued)

FOREIGN PATENT DOCUMENTS

EP 2 497 545 9/2012
EP 2 529 806 12/2012

(Continued)

OTHER PUBLICATIONS

"The Legend of Zelda: The Wind Waker Instruction Booklet", by Nintendo (Game Release data: Dec. 13, 2002, with English translation, Japanese Language, 5 pages.

(Continued)

*Primary Examiner* — William Titcomb
(74) *Attorney, Agent, or Firm* — Nixon & Vanderhye P.C.

(57) ABSTRACT

A non-limiting example game system includes an information processing apparatus that functions as a game apparatus to which a terminal device and a television are connected. A game screen is displayed on the television and an item screen is displayed on an LCD of the terminal device, for example. If a player touches-on an item in the item screen and drags the item onto an assigning image, and then, performs a touch-off, the item is assigned to an operating button corresponding to the assigning image. When an item is touched-on, images corresponding to the item and the assigning image are displayed on the game screen in a superposed manner.

22 Claims, 14 Drawing Sheets

(51) Int. Cl.
*A63F 13/20* (2014.01)
*A63F 13/23* (2014.01)
*G06F 3/0481* (2013.01)
*A63F 13/26* (2014.01)
*A63F 13/92* (2014.01)
*A63F 13/335* (2014.01)
*A63F 13/53* (2014.01)

(52) U.S. Cl.
CPC .......... *G06F 3/04817* (2013.01); *A63F 13/26* (2014.09); *A63F 13/335* (2014.09); *A63F 13/53* (2014.09); *A63F 13/92* (2014.09); *A63F 2300/1068* (2013.01); *A63F 2300/308* (2013.01); *A63F 2300/6045* (2013.01)

(58) Field of Classification Search
USPC ........................................................ 715/761
See application file for complete search history.

(56) References Cited

U.S. PATENT DOCUMENTS

| | | | | |
|---|---|---|---|---|
| 8,239,487 | B1* | 8/2012 | Hoffman | G06Q 30/00 463/42 |
| 9,022,862 | B2* | 5/2015 | Abe | A63F 13/02 463/30 |
| 9,055,267 | B2* | 6/2015 | Raghoebardajal | G06F 3/011 |
| 9,223,487 | B2* | 12/2015 | Maeda | G06F 3/04845 |
| 2003/0216177 | A1* | 11/2003 | Aonuma | A63F 13/10 463/32 |
| 2004/0163133 | A1* | 8/2004 | Ueda | A63F 13/10 725/133 |
| 2005/0049022 | A1* | 3/2005 | Mullen | A63F 13/12 463/1 |
| 2005/0250565 | A1* | 11/2005 | Nojiri | A63F 13/10 463/8 |
| 2008/0102424 | A1* | 5/2008 | Holljes | A63B 21/4047 434/247 |
| 2009/0102975 | A1* | 4/2009 | Arai | A63F 13/10 348/589 |
| 2009/0254842 | A1* | 10/2009 | Leacock | H04L 12/1827 715/757 |
| 2010/0169837 | A1* | 7/2010 | Hyndman | G06F 3/04815 715/848 |
| 2010/0238131 | A1* | 9/2010 | Aoyagi | G06F 3/04842 345/173 |
| 2010/0248835 | A1* | 9/2010 | Suzuki | A63F 13/06 463/36 |
| 2010/0275122 | A1* | 10/2010 | Buxton | G06F 3/0488 715/728 |
| 2010/0304871 | A1* | 12/2010 | Yamada | A63F 13/10 463/43 |
| 2010/0306717 | A1* | 12/2010 | Yamada | A63F 13/10 715/863 |
| 2011/0105228 | A1* | 5/2011 | Yamada | A63F 13/06 463/31 |
| 2011/0207525 | A1* | 8/2011 | Allen | G07F 17/32 463/25 |
| 2011/0225538 | A1 | 9/2011 | Oyagi et al. | |
| 2011/0304651 | A1* | 12/2011 | Shimura | A63F 13/10 345/661 |
| 2012/0108328 | A1 | 5/2012 | Konno et al. | |
| 2012/0258796 | A1 | 10/2012 | Ohta et al. | |
| 2012/0302339 | A1 | 11/2012 | Kimura et al. | |
| 2012/0306739 | A1* | 12/2012 | Tsuda | H04N 21/4122 345/156 |
| 2013/0106846 | A1* | 5/2013 | Abe | A63F 13/02 345/419 |
| 2013/0184064 | A1* | 7/2013 | Manning | G07F 17/3211 463/25 |
| 2013/0191783 | A1* | 7/2013 | Sugita | G06F 3/0482 715/810 |
| 2013/0267248 | A1* | 10/2013 | Barnes | G01C 21/367 455/456.3 |
| 2013/0281189 | A1* | 10/2013 | Gagner | G07F 17/3225 463/25 |
| 2014/0059486 | A1* | 2/2014 | Sasaki | G01S 7/52084 715/810 |
| 2014/0128148 | A1* | 5/2014 | Soffin | A63F 13/00 463/25 |
| 2014/0155030 | A1* | 6/2014 | Malik | H04N 21/26613 455/411 |
| 2014/0179423 | A1* | 6/2014 | Deng | A63F 13/355 463/31 |
| 2015/0042619 | A1* | 2/2015 | Forti | G06F 3/0488 345/175 |

FOREIGN PATENT DOCUMENTS

| | | |
|---|---|---|
| JP | 2009-18028 | 1/2009 |
| JP | 2011-211685 | 10/2011 |
| JP | 2012-139318 | 7/2012 |
| JP | 2012-221145 | 11/2012 |
| JP | 2012-239794 | 12/2012 |

OTHER PUBLICATIONS

"The Legend of Zelda: The Wind Waker Instruction Booklet", by Nintendo (Game Release data: Dec. 13, 2002, with English translation, English Language, 16 pages.

Extended European Search Report (8 pgs.) dated Jan. 5, 2015 issued in corresponding European Application No. 14158350.0.

* cited by examiner (A) GAME SCREEN 100

(B) ITEM SCREEN 200

(A) GAME SCREEN 100

(B) ITEM SCREEN 200

(A) GAME SCREEN 100

(B) ITEM SCREEN 200

INFORMATION PROCESSING APPARATUS, INFORMATION PROCESSING SYSTEM, STORAGE MEDIUM AND INFORMATION PROCESSING METHOD

CROSS REFERENCE OF RELATED APPLICATION

The disclosure of Japanese Patent Application No. 2013-171359 filed on Aug. 21, 2013 is incorporated herein by reference.

FIELD

This application describes an information processing apparatus, information processing system, storage medium and information processing method, displaying two screens that are different from each other.

SUMMARY

It is a primary object of the present embodiment to provide a novel information processing apparatus, information processing system, storage medium and information processing method.

Furthermore, another object of the present embodiment is to provide an information processing apparatus, information processing system, storage medium and information processing method, capable of increasing an operability.

A first embodiment is an information processing apparatus, comprising: a first displaying unit, a first determining unit and a second displaying unit. The first displaying unit is operable to display at least one first object that is a selecting target on a first screen. The first determining unit is operable to determine whether the first object is selected. The second displaying unit is operable to display, upon determining by the first determining unit that the first object is selected, a second object corresponding to the selected first object in a superposed manner on a second screen that is different from the first screen.

In accordance with the first embodiment, since the second object corresponding to the first object is displayed on the second screen upon selecting the first object that is a selecting target on the first screen, it is possible to make an operation for the first object while seeing the second screen but without seeing the first screen after the first object is selected.

A second embodiment is according to the first embodiment, wherein the information processing apparatus further comprises a first receiving unit and a moving unit. The first receiving unit is operable to receive a moving operation for the first object that is selected. The moving unit is operable to move, when the moving operation is received by the first receiving unit, the first object in accordance with the moving operation and also move the second object as similar to the first object.

In accordance with the second embodiment, it is possible to perform a moving operation for a selected first object while seeing the second screen.

A third embodiment is according to the second embodiment, wherein the moving operation includes a slide. By using a touch panel, the first object is moved by a drag or a flick, for example.

In accordance with the third embodiment, it is possible to move the first object by an intuitive operation.

A fourth embodiment is according to the first embodiment, wherein the first determining unit is operable to further determine whether a selection of the first object is canceled. The second displaying unit is operable to non-display the second object on the second screen upon determining, by the first determining unit, that the selection of the first object is canceled.

In accordance with the fourth embodiment, if the movement of the first object is ended by canceling the selection of the first object, the second object is automatically non-displayed on the second screen, and accordingly, it is possible to save time and effort for an operation.

A fifth embodiment is according to the fourth embodiment, wherein the information processing apparatus further comprises a second determining unit that is operable to determine whether the first object comes to rest when it is determined by the first determining unit that the selection of the first object is canceled. The second displaying unit is operable to non-display the second object on the second screen upon determining, by the second determining unit, that the first object comes to rest. In a case where the first object is moved by a slide or a flick, the second object is non-displayed on the second screen when the movement of the first object is ended.

In the fifth embodiment, as similar to the fourth embodiment, it is also possible to save time and effort for an operation.

A sixth embodiment is according to the first embodiment, wherein the first displaying unit is operable to further display a first moving destination object that is a moving destination of the first object, and the second displaying unit is operable to further display a second moving destination object corresponding to the first moving destination object on the second screen in a superposed manner.

In accordance with the sixth embodiment, if the second object is operated to be moved to the second moving destination object, it is possible to move the first object to the first moving designation object. That is, the first object can be operated while seeing the second screen.

A seventh embodiment is according to the sixth embodiment, wherein the second displaying unit is operable to display the second object and the second moving destination object on the second screen in a superposed manner with a positional relationship in accordance with a positional relationship between the first object and the first moving destination object that are displayed on the first screen.

In accordance with the seventh embodiment, since the positional relationship between the second object and the second moving destination object corresponds to the positional relationship between the first object and the first moving destination object, the second object is moved according to the first object, for example, and therefore, the first object can be easily moved while seeing the second screen.

An eighth embodiment is according to the sixth embodiment, wherein the second displaying unit is operable to non-display the second object and the second moving destination object upon moving the first object that is selected to the first moving destination object.

In accordance with the eighth embodiment, the second object and the second moving destination object are automatically non-displayed, and accordingly, it is possible to save time and effort for an operation.

A ninth embodiment is according to the sixth embodiment, wherein the second displaying unit is operable to display the second object and the second moving destination object in a semitransparent manner.

In accordance with the ninth embodiment, since the second object and the second moving destination object are displayed in a semitransparent manner, it is possible to prevent a content that is to be displayed beneath these objects from becoming not to be seen.

A tenth embodiment is according to the first embodiment, wherein first screen and the second screen are screens that depict spaces different from each other.

In accordance with the tenth embodiment, since the second object is displayed on the second screen that depicts the space different from the space that is depicted on the first screen, it is possible to operate the first object while seeing the content of the space that is depicted on the second screen.

An eleventh embodiment is according to the first embodiment, wherein the first screen is a screen for selecting the first object, and the second screen is an information processing screen capable of representing at least a manner how the first object is used.

In accordance with the eleventh embodiment, the first object that is displayed on the selecting screen can be operated while seeing the information processing screen.

A twelfth embodiment is according to the second embodiment, wherein the information processing apparatus further comprises a second receiving unit and a performing unit. The second receiving unit is operable to receive an operating input with respect to the second screen. The performing unit is operable to perform information processing in accordance with the operating input that is received by the second receiving unit.

In accordance with the twelfth embodiment, since the operation with respect to the second screen is also received so as to perform the information processing, it is possible to operate not only the first object but also the information processing. That is, the first object can be operated while the information processing is not suspended.

A thirteenth embodiment is according to the twelfth embodiment, an information processing apparatus further comprises a pointing device and an input device of a type different from the pointing device. The first receiving unit is operable to receive the moving operation using the pointing device and the second receiving unit is operable to receive an operating input using the input device.

In accordance with the thirteenth embodiment, as similar to the twelfth embodiment, the first object can be operated while the information processing is not suspended.

A fourteenth embodiment is according to the thirteenth embodiment, wherein the pointing device is a touch panel and the input device is a button input device.

In accordance with the fourteenth embodiment, since input devices of types different from each other are employed, it is possible to distinctively perform an operation for the first object and an operation for the information processing.

A fifteenth embodiment is according to the first embodiment, wherein the first screen is displayed on a portable type display device, and the second screen is displayed on a further display device that is separated from the portable type display device.

In accordance with the fifteenth embodiment, even if the first screen is displayed on the portable type display device that is kept at hand and the second screen is displayed on the display device such as a television receiver keeping a certain short distance from the user, after the first object is selected while seeing the first screen being displayed on the portable type display device, the first object can be operated while seeing the second screen being displayed on the television receiver.

A sixteenth embodiment is an information processing system, comprising: a first displaying unit operable to display at least one first object that is a selecting target on a first screen; a first determining unit operable to determine whether the first object is selected; and a second displaying unit operable to display, upon determining by the first determining unit that the first object is selected, a second object corresponding to the selected first object in a superposed manner on a second screen that is deferent from the first screen.

A seventeenth embodiment is a non-transitory computer readable storage medium storing an information processing program executable by at least one computer of an information processing system comprising a first display device and a second display device that are different from each other, wherein the information processing program causes the at least one computer to: display at least one first object that is a selecting target on the first display device; determine whether the first object is selected; and display, upon determining that the first object is selected, a second object corresponding to the selected first object in a superposed manner on the second display device.

An eighteenth embodiment is an information processing method performed by at least one computer of an information processing system comprising a first display device and a second display device that are different from each other, comprising steps of: (a) displaying at least one first object that is a selecting target on the first display device; (b) determining whether the first object is selected; and (c) displaying, upon determining that the first object is selected, a second object corresponding to the selected first object in a superposed manner on the second display device.

In accordance with each of the sixteenth to eighteenth embodiments, as similar to the first embodiment, it is possible to increase the operability.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

Figure 1:
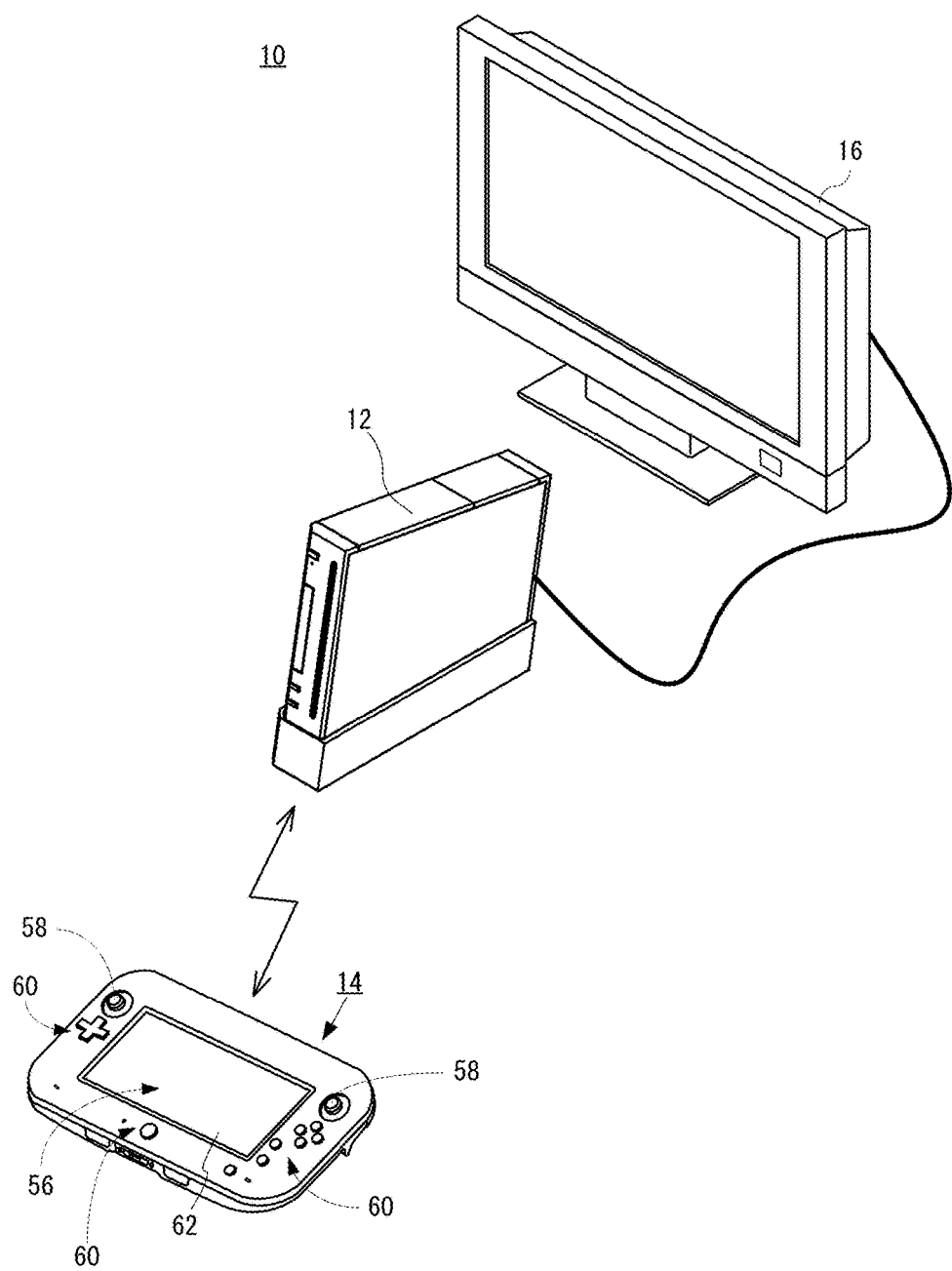
FIG. 1 is an appearance view of a non-limiting example game system.

A non-limiting example game system 10 according to an embodiment is described with referring to drawings below. The game system 10 shown in FIG. 1 includes a stationary-type game apparatus 12 and a potable-type terminal device 14. Furthermore, the game system 10 includes a stationary-type display device (hereinafter, referred to as "television") 16 typified by a television receiver or the like, which is connected with the game apparatus 12 and the television 16 via connecting cords. In the game system 10, a game process is performed in the game apparatus 12 based on a game operation using the terminal device 14, and an image obtained by the game process is displayed on the television 16 and/or the terminal device 14.

Although not shown, into the game apparatus 12, the optical disk that is an example of an information storage medium that is used to be replaceable with respect to the game apparatus 12 is detachably loaded. In the optical disk, an information processing program (typically, an application program such as a game program) to be executed in the game apparatus 12 is stored. The game apparatus 12 performs information processing (game processing) by reading and executing the information processing program stored in the optical disk.

The television 16 displays a game image obtained through the game processing performed by the game apparatus 12. The television 16 has a speaker 16a (FIG. 2), and the speaker 16a outputs a game sound obtained as a result of the game processing described above.

In addition, in another embodiment, the game apparatus 12 and the stationary-type display device may be integrally formed with each other. Furthermore, communications between the game apparatus 12 and the television 16 may be performed wirelessly.

The terminal device 14 sends and receives data with at least the game apparatus 12. The user (player) can use the terminal device 14 by moving it with his or her hands, and by placing the terminal device 14 at an arbitrary position. The terminal device 14 has an inputting means such as a touch panel 56, an analog pad 58 and an operating button 60 and a displaying means such as an LCD 62. The terminal device 14 can communicate with the game apparatus 12 through a wireless communication using a technique of Bluetooth (registered trademark), for example; however, the terminal device 14 and the game apparatus 12 may be connected to each other by a cable or wire. The terminal device 14 receives from the game apparatus 12 data of an image (game image, for example) produced in the game apparatus 12, and displays an image that is received on the LCD 62. Furthermore, the terminal device 14 sends to the game apparatus 12 operating data indicating a content of the operation performed on the user's own device.

It should be noted that in this embodiment, an LCD is employed as a display device, but the terminal device 14 may include another arbitrary display device such as a display using EL (Electro Luminescence), for example.

Additionally, in FIG. 1, the number of terminal devices 14 included in the game system 10 is one, but the game apparatus 12 can communicate with a plurality of terminal devices 14, and it is possible for a plurality of persons to play a game by simultaneously using a predetermined number of terminal devices 14.

Figure 2:
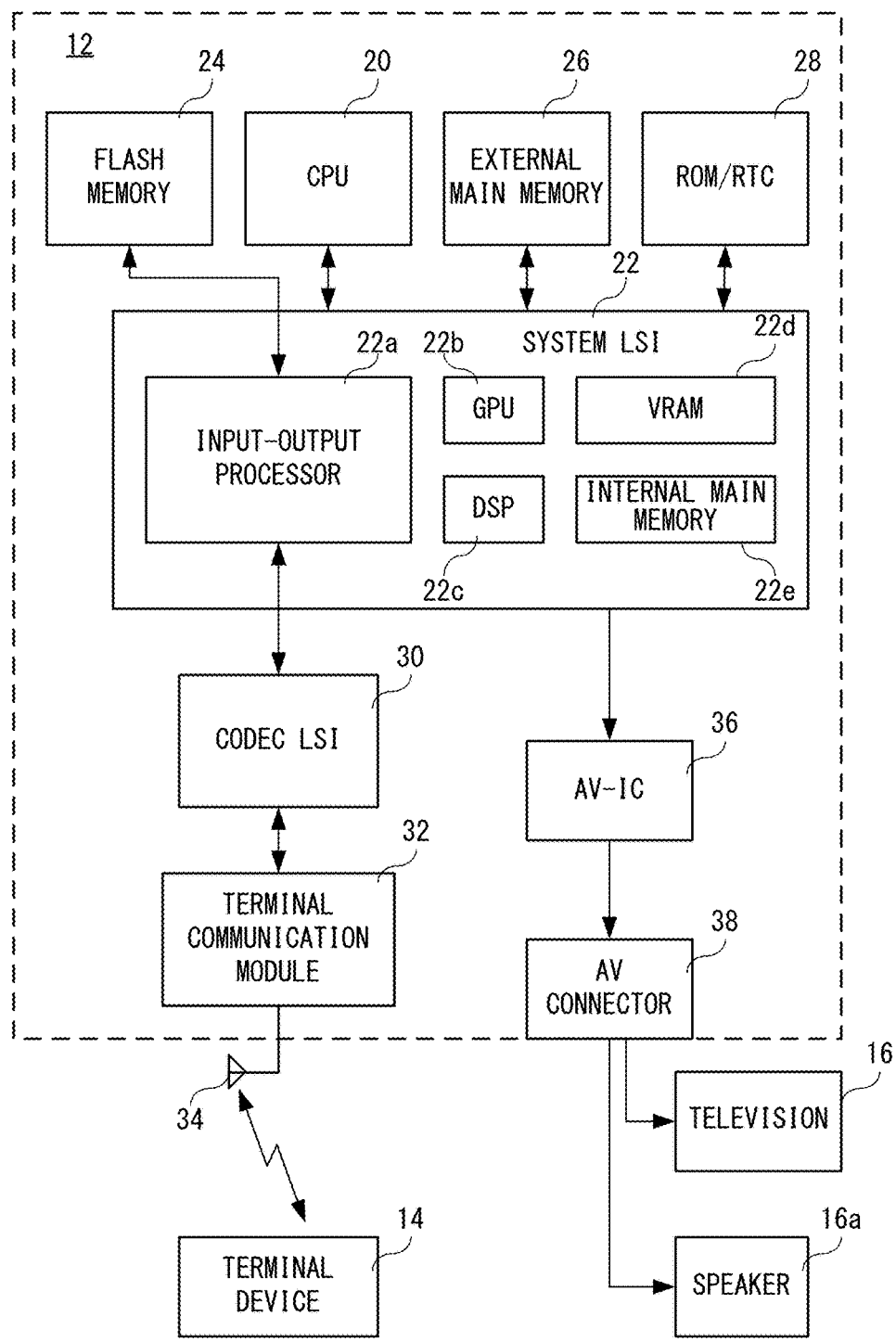
FIG. 2 is a block diagram showing a non-limiting example electric configuration of a game apparatus.

FIG. 2 is a block diagram showing a non-limiting example electric configuration of a game apparatus 12. The game apparatus 12 has a CPU 20, a system LSI 22, an external main memory 26, a ROM/RTC 28, an AV-IC 36, etc.

The CPU 20 is for performing the game processing by executing the game program stored in the optical disk, and functions as a game processor. The CPU 20 is connected to the system LSI 22. The system LSI 22 is connected with the external main memory 26, the ROM/RTC 28 and the AV-IC 36 in addition to the CPU 20. The system LSI 22 performs processing for controlling data transfer between the respective components connected thereto, producing images to be displayed, acquiring data from external information processing devices, and so on.

The external main memory 26 being volatile is for storing programs such as a game program read from the optical disk, a game program, etc. read from the flash memory 24, storing various data, and is utilized as a working area and a buffer area for the CPU 20. The ROM/RTC 28 has a ROM (so called a boot ROM) including a program for activating the game apparatus 12 and a clock circuit (RTC) for counting a time.

In addition, program data, texture data, etc. read from the optical disk, are written into an internal main memory 22e described later or the external main memory 26.

The system LSI 22 is provided with an input-output processor (I/O processor) 22a, a GPU 22b, a DSP 22c, a VRAM 22d, and the internal main memory 22e. Although illustration is omitted, these components 22a-22e are connected with each other by internal buses.

The GPU 22b configures a part of a depicting or drawing means, and produces image data according to a graphics command from the CPU 20. Here, data such as polygon data, texture data, etc. read from the main memory (22e, 26) is stored in the VRAM 22d, and the GPU 22b produces the image data by using such the data. In this embodiment, the game apparatus 12 produces both of a game image to be displayed on the television 16 and a game image to be displayed on the terminal device 14. Hereinafter, the game image displayed on the television 16 may be called as "television game image", and the game image displayed on the terminal device 14 may be called as "terminal game image".

The DSP 22c functions as an audio processor, and generates sound data by using sound data and sound waveform (tone) data stored in the internal main memory 22e and the external main memory 26. In this embodiment, with respect to the game sound, as similar to the game image, both of a game sound to be output from the speaker 16a of the television 16 and a game sound to be output from the speaker 66 of the terminal device 14 are produced. Hereinafter, the game sound output from the television 16 may be called as "television game sound", and the game sound output from the terminal device 14 may be called as "terminal game sound".

As described above, data of images and sounds (including sound effects, game music, etc. This holds true below.) to be output by the television 16 out of the images and sounds produced in the game apparatus 12 are read by the AV-IC 36. The AV-IC 36 outputs the read image data to the television 16 via the AV connector 38, and outputs the read sound data to the speaker 16a integrated in the television 16. Thus, an image is displayed on the television 16 while a sound is output from the speaker 16a.

Also, data of images and sounds to be output by the terminal device 14 out of the images and sounds produced in the game apparatus 12 are sent to the terminal device 14 by the input-output processor 22a, etc. The data transmission to the terminal device 14 by the input-output processor 22a, etc. is described later.

The input-output processor 22a performs data transmission and reception with the components connected thereto, and performs downloading data from external information processing devices. Also, the input-output processor 22a is connected to the flash memory 24 and a codec LSI 30. The codec LSI 30 is connected with a terminal communication module 32, and an antenna 34 is connected to the terminal communication module 32.

The CPU 20 executes the game program to thereby read the data stored in the flash memory 24 so as to use the data in the game program. In the flash memory 24, in addition to the data to be sent and received between the game apparatus 12 and the external information processing apparatuses, save data (result data or proceeding data of the game) of the game played by using the game apparatus 12 may be stored. Also, in the flash memory 24, the game program may be stored.

In addition, although not shown, the input-output processor 22a can be connected to a network such as an internet, etc. with using the network communication module so as to perform a communication with (send/receive data to or from) an external information processing apparatus that is connected to the network, another game apparatus, various kinds of servers, etc., for example.

Also, the game apparatus 12 can send and receive data of images or videos, sounds, etc. to and from the terminal device 14. The input-output processor 22a outputs the data of the game image produced by the GPU 22b to the codec LSI 30 if sending the game image (terminal game image) to the terminal device 14. The codec LSI 30 performs predetermined compression processing on the image data from the input-output processor 22a. The terminal communication module 32 communicates with the terminal device 14 wirelessly. Accordingly, the image data compressed by the codec LSI 30 is sent to the terminal device 14 via the antenna 34 by the terminal communication module 32. In this embodiment, the codec LSI 30 compresses the image data by using a high efficient compression technique, such as H.264 standard, for example.

It should be noted that a compression technique except for it may be used, and the image data may be adapted to be sent without being compressed if the communication speed is high enough.

Furthermore, the terminal communication module 32 is a communication module for which the Wi-Fi certification is obtained, for example, and may use a MIMO (Multiple Input Multiple Output) technique employed in IEEE802.11n standard, for example, to thereby make high speed wireless communications with the terminal device 14, or may use other communication systems.

In addition, the game apparatus 12 sends sound data to the terminal device 14 besides the image data. That is, the input-output processor 22a outputs the sound data produced by the DSP 22c to the terminal communication module 32 via the codec LSI 30. The codec LSI 30 also performs the compression processing on the sound data, similar to the image data. The compression format of the sound data may be of any format. In another embodiment, the sound data may be sent without being compressed. The terminal communication module 32 sends the compressed image data and sound data to the terminal device 14 via the antenna 34.

Additionally, the game apparatus 12 can receive various data from the terminal device 14. In this embodiment, the terminal device 14 sends operating data, image data, and sound data. Each data sent from the terminal device 14 is received by the terminal communication module 32 via the antenna 34. Here, the image data and the sound data from the terminal device 14 is performed with compression processing similar to the image data and the sound data from the game apparatus 12 to the terminal device 14.

Accordingly, the image data and the sound data are sent from the terminal communication module 32 to the codec LSI 30, then, undergo expansion processing by the codec LSI 30, and are output to the input-output processor 22a.

Figure 3:
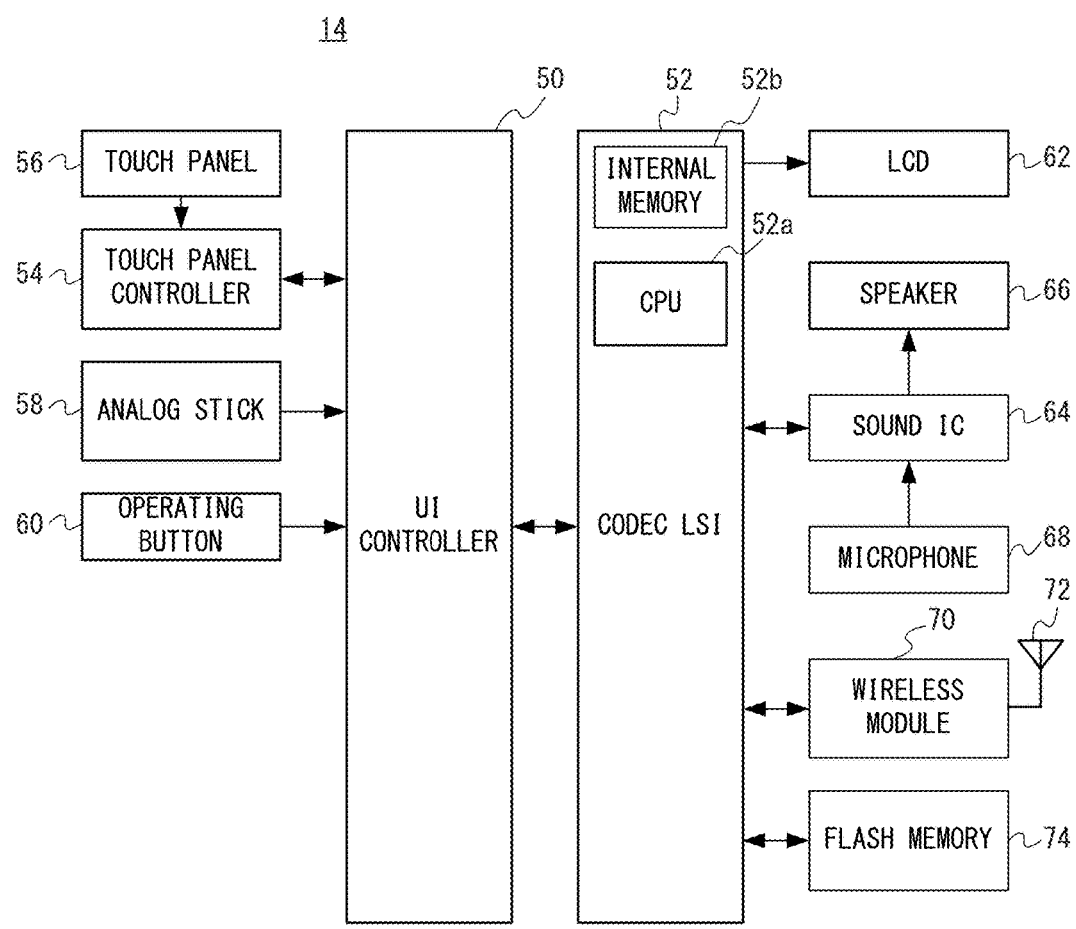
FIG. 3 is a block diagram showing a non-limiting example electric configuration of a terminal device.

In addition, the image data from the terminal device 14 includes image data corresponding to an image imaged by a camera not shown and so on, the sound data from the terminal device 14 includes sound data corresponding to sounds (voice, hand clapping, etc.) that is generated by the player and detected by a microphone 68 (see FIG. 3).

On the other hand, the operating data from the terminal device 14, which has less data than images and sounds, may not be performed with the compression processing. Also, it may be encoded as required or may not be encoded. Accordingly, the operating data is received in the terminal communication module 32, and then output to the input-output processor 22a via the codec LSI 30. The input-output processor 22a stores (temporarily stores) the data received from the terminal device 14 in the buffer area of the internal main memory 22e or the external main memory 26.

In addition, it is not necessary to limit the structure of the game apparatus 12 to this embodiment, and the game apparatus 12 may have structure capable of connecting with expansion equipment.

FIG. 3 is a block diagram showing a non-limiting example electric configuration of the terminal device 14. As shown in FIG. 3, the terminal device 14 has a user interface controller (UI controller) 50, a touch panel controller 54, a codec LSI 52, a speaker 66, a sound IC 64, a microphone 68, a wireless module 70, an antenna 72 and a flash memory 74 besides the components shown in FIG. 1. These electronic components are mounted on an electronic circuit board and contained in the housing.

The UI controller 50 is a circuit for controlling an input and an output of data to and from various input-output portions. The UI controller 50 is connected with the touch panel controller 54, the analog stick 58 and the operating button 60. Also, the UI controller 50 is connected to the codec LSI 52.

The touch panel controller 54 is connected to the touch panel 56, and is a circuit for performing a control on the touch panel 56. The touch panel controller 54 generates touch position data in a predetermined format on the basis of a signal from the touch panel 56 and outputs it to the UI controller 50. The touch position data represents coordinates of the position (touch position) where a touch input (input operation) is made on an inputting surface of the touch panel 56.

Here, the touch panel controller 54 performs reading signals from the touch panel 56 and generation of touch position data at each predetermined time. Furthermore, from the UI controller 50 to the touch panel controller 54, various control instructions with respect to the touch panel 56 are output.

The analog stick 58 outputs stick data representing a direction that the stick portion to be operated by the fingers of the user is slid (or tilted) and an amount of the sliding to the UI controller 50. Furthermore, the operating button 60 outputs operation button data representing an input status (whether to be pushed or not) with respect to each operation button (a cross button and various push buttons) or key switch to the UI controller 50.

The UI controller 50 outputs operating data including the touch position data, the stick data, and the operation button data received from the respective components described above to the codec LSI 52.

The codec LSI 52 is a circuit for performing compression processing on data to be sent to the game apparatus 12 and expansion processing on the data sent from the game apparatus 12. The codec LSI 52 is connected with the LCD 62, the sound IC 64, the wireless module 70, and the flash memory 74. Also, the codec LSI 52 includes a CPU 52*a* and an internal memory 52*b*.

The terminal device 14 is adapted so as not to perform the game processing itself, but needs to execute a minimum program for management and communication of the terminal device 14. When the power is turned on, the CPU 52*a* reads the program stored in the flash memory 74 into the internal memory 52*b* and performs it to thereby activate the terminal device 14. Here, the terminal device 14 is activated and suspended on the basis of operating data from the game apparatus 12. It should be noted that in this embodiment, the suspension of the terminal device 14 means a sleep state that the power is supplied to a part of the circuit components (UI controller 50, codec LSI 52 and wireless module 70). In addition, a partial area of the internal memory 52*b* is used as a VRAM for the LCD 62.

The sound IC 64 is connected to the speaker 66 and the microphone 68, and is a circuit for controlling an input and output of sound data to and from the speaker 66 and the microphone 68. That is, in a case that sound data is received from the codec LSI 52, the sound IC 64 outputs a sound signal obtained by performing D/A conversion on the sound data to the speaker 66, to thereby make the speaker 66 output a sound. Also, the microphone 68 detects sound (voices and cracks (hand clapping), etc. of the user (player)) that the terminal device 14 receives, and outputs a sound signal indicating the sound to the sound IC 64. The sound IC 64 performs A/D conversion on the sound signal from the microphone 68, and outputs the sound data in the predetermined format to the codec LSI 52.

The codec LSI 52 sends to the game apparatus 12 the image data from the camera, the sound data from the microphone 68, and the operating data from the UI controller 50 via the wireless module 70. In this embodiment, the codec LSI 52 performs compression processing on the image data and the sound data similar to the codec LSI 30. The operating data and the compressed image data and sound data described above are output to the wireless module 70 as sending data.

The wireless module 70 is connected with the antenna 72, and the wireless module 70 sends the aforementioned sending data to the game apparatus 12 via the antenna 72. The wireless module 70 has a function similar to the terminal communication module 32 of the game apparatus 12. That is, the wireless module 70 has a function of connecting to the wireless LAN following the system based on the IEEE 802.11n standard, for example. The data to be sent may be encoded as required or may not be encoded.

As described above, the sending data to be sent from the terminal device 14 to the game apparatus 12 include the operation data, the image data and the voice data.

In addition, the terminal device 14 of this embodiment comprises an operating means such as the touch panel 56, the analog stick 58, and the operating button 60, but may be adapted to have other operating means in place of these operating means, or with these operating means in another embodiment. For example, as sensors for evaluating a motion (including a position and posture, or changes in the position and the posture) of the terminal device 14, at least one of a magnetic sensor, an acceleration sensor and a gyro sensor may be provided.

Additionally, the terminal device 14 is configured to have the camera and the microphone 68, but in another embodiment, it may not have the camera and the microphone 68, or may have either one of them.

An example of a game program executed in such a game system 10 will be described. In a game with a virtual space (virtual game) according to this embodiment, a player character can, according to an operation by a player, move in the game world, fight with an enemy character, get an item, equip or use an item. Then, if satisfying a predetermined condition by defeating a predetermined enemy character (boss character), a game clear is performed.

Figure 4:
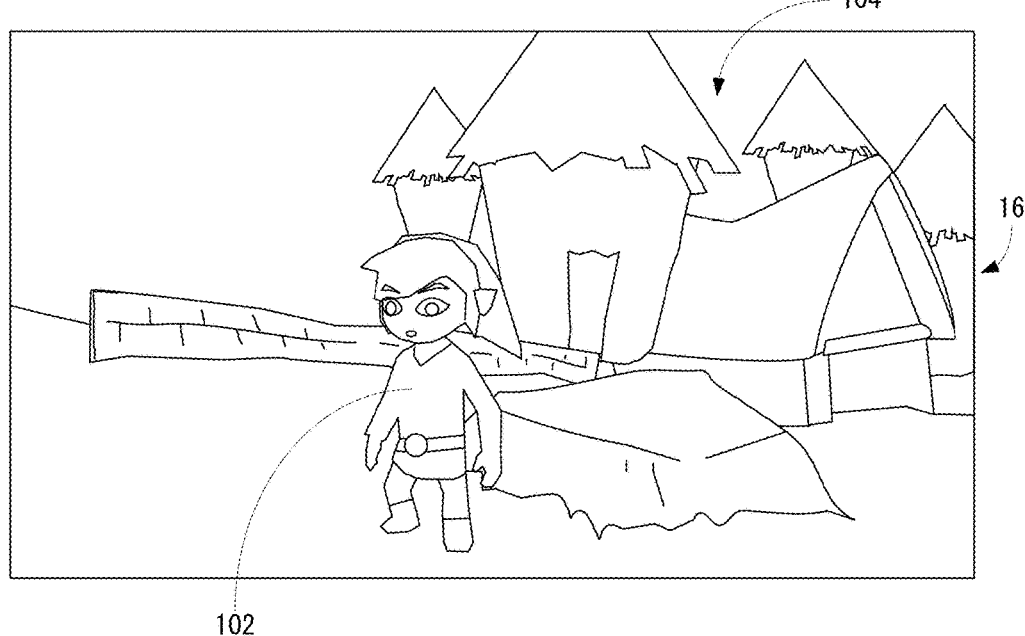
FIG. 4 is a view showing non-limiting first examples of a game screen and an item screen.
Figure 4:
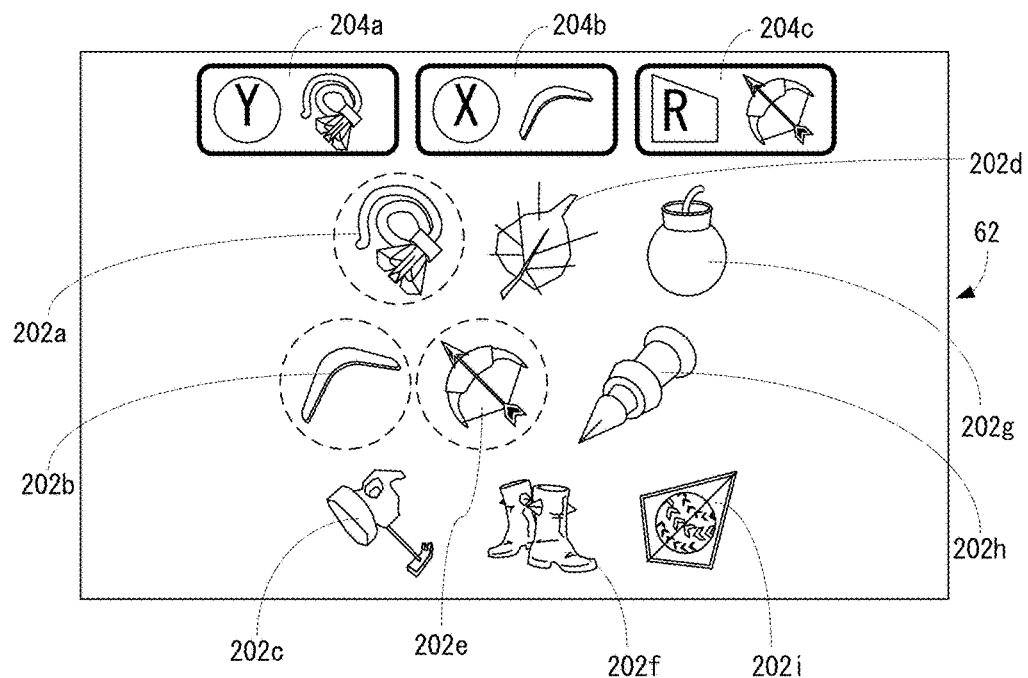

In FIG. 4(A), there is shown an example of a game screen 100 for the virtual game that is displayed on the television 16. The game screen 100 is essentially a screen that represents the game world of the virtual game and progress of the virtual game while centering the player character. In the game screen 100 shown in FIG. 4(A), the player character 102 is displayed and a background image 104 is also displayed.

In FIG. 4(B), an example of an item screen 200 that is displayed on the LCD 62 of the terminal device 14 according to an operation by the player during the play of the virtual game is shown. The item screen 200 is a screen for confirming an item that is possessed by the player character 102 or setting (assigning) an item to an operating button of the terminal device 14.

As shown in FIG. 4(B), items 202*a*, 202*b*, 202*c*, 202*d*, 202*e*, 202*f*, 202*g*, 202*h* and 202*i* are displayed on the item screen 200. These items 202*a*-202*i* are items possessed by the player character 102 (hereinafter, may be called as "possessed item"). The items 202*a*-202*i* are weapons, protectors, tools, etc., for example, and equipped or used by the player character 102 according to the operation by the player. Hereinafter, in a case where it is unnecessary to individually identify each of the items 202*a*-202*i*, simply called as "item 202".

Furthermore, in an upper portion of the item screen 200, images (assigning images) 204*a*, 204*b* and 204*c* for setting (assigning) the item 202 to the operating button 60 are displayed. As seen from FIG. 4(B), in this embodiment, the item 202 can be assigned to a Y button, an X button and an R button that are included in the operating button 60. In the item screen 200 of FIG. 4(B), the assigning images 204*a*-204*c* include characters for identifying the operating button 60 and images that the items 202 are reduced in size for identifying the items 202 that are assigned to, and indicate that the item 202 is assigned to the corresponding operating button 60. Specifically, the assigning image 204*a* indicates that the item 202*a* is assigned to the Y button, the assigning image 204*b* indicates that the item 202*b* is assigned to the X button, and the assigning image 204*c* indicates that the item 202*e* is assigned to the R button.

Furthermore, as shown in FIG. 4(B), the items 202 (here, the items 202*a*, 202*b* and 202*e*) assigned to the operating buttons 60 are indicated to be surrounded by a circular dotted line frame in order to make these items distinguishable over the items 202 not being assigned to the operating button 60 (here, the items 202c, 202d, 202f, 202g, 202h and 202i). In addition, this is only an example, instead of the dotted line frame, a circle having a size approximately the same size as the dotted line frame is filled with a color that is different from a background color and the item 202 may be displayed in the front of the circle. Furthermore, the item 202 that is assigned to the operating button 60 may be displayed in a color-reversed manner or in a gray out manner.

Although not shown, in a case where the item 202 is not assigned to the operating button 60 corresponding to the assigning images (204a, 204b, 204c), an image that the item 202 is reduced in size is not displayed. At the beginning that the virtual game is started, for example, since the player character 102 does not possess the item 202, no item is assigned to the operating button 60 corresponding to the assigning images (204a, 204b, 204c). Then, if the player character 102 acquires the item 202, the item 202 that is acquired is added as a possessed item. Thereafter, by displaying the item screen 200, it is possible to assign a desired item 202 to the operating button 60.

In a case where the item 202 is to be assigned to the operating button 60, a desired item 202 is selected out of the possessed items that are selecting targets, and the item 202 that is selected is moved onto the assigning image (204a, 204b, 204c) that is displayed as a moving destination object.

More specifically, the player touches (touches-on) a desired item 202 by means of a finger or a stylus pen, so that the desired item 202 can be selected out of the possessed items. In the item screen 200 shown in FIG. 5(B), for example, the item 202c is selected.

Figure 5:
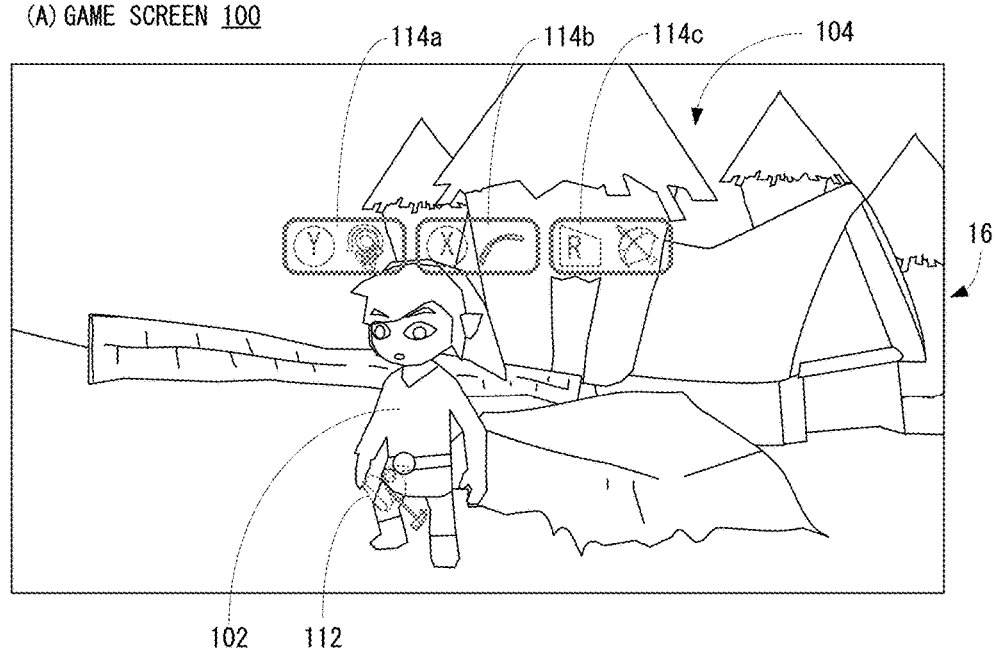
FIG. 5 is a view showing non-limiting second examples of the game screen and the item screen.
Figure 5:
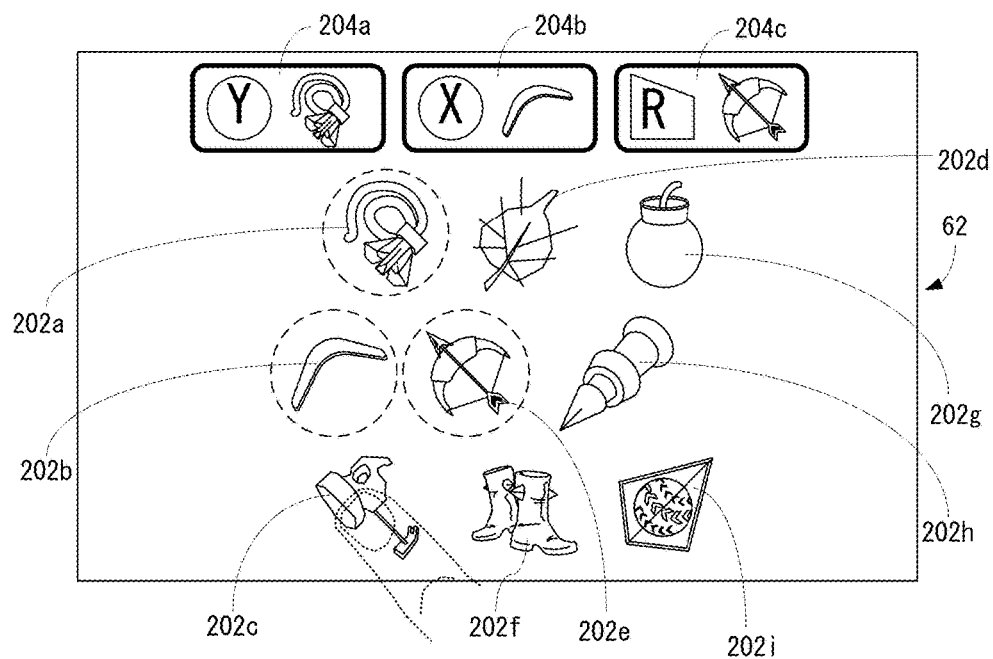

At this time, as shown in FIG. 5(A), in the game screen 100, an item 112 and assigning images 114a, 114b and 114c are displayed in a superposed manner on the player character 102 and the background image 104. The item 112 is an image (object) corresponding to the item 202c, and the assigning images 114a-114c are images (objects) corresponding to the assigning images 204a-204c. The item 112 and the assigning images 114a-114c are displayed in a semitransparent manner, for example; however, may not be displayed in a semitransparent manner.

Furthermore, as seen from FIG. 5(A) and FIG. 5(B), the item 112 and the assigning images 114a-114c are displayed in the game screen 100 with a positional relationship corresponding to a positional relationship between the item 202 and the assigning images 204a-204c in the item screen 200.

A reason why as described above, the item 112 and the assigning images 114a-114c are displayed on the game screen 100 upon selecting the item 202 on the item screen 200 is for making the item 202 be assigned to the operating button 60 while seeing the game screen 100.

Figure 6:
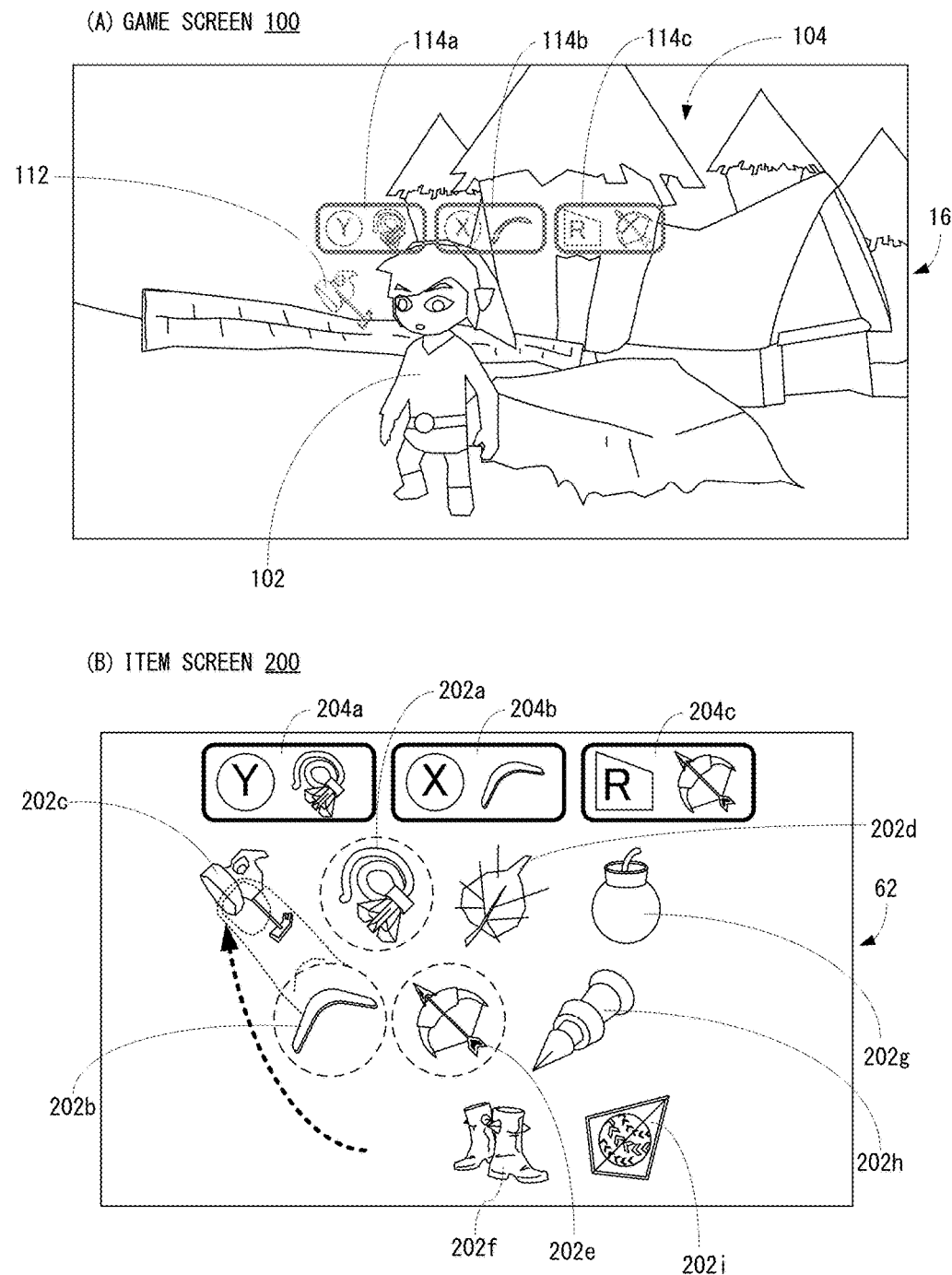
FIG. 6 is a view showing non-limiting third examples of the game screen and the item screen.

Therefore, as shown in FIG. 6(A) and FIG. 6(B), if the player drags the item 202c on the item screen 200, in accordance with a movement of the item 202c, the item 112 that is being displayed on the game screen 100 is moved.

In addition, the drag means an image is slid to be shifted in a state that the image such as an icon on a screen is selected.

Furthermore, in FIG. 6(B), it is shown that the item 202c is dragged with using a thick dotted line and an arrow mark.

As described above, in this embodiment, the game screen 100 is displayed on the television 16, and apart from the game screen 100, the item screen 200 is displayed on the LCD 62 of the terminal device 14 that is kept at the hand of the player. Therefore, if no countermeasure is taken, it is considered that the player drags the item 202 to be moved to a desired one of assigning images 204a, 204b and 204c while seeing the item screen 200. In such a case, the player does not see the game screen 100 or a time that the player sees the game screen 100 becomes shorten. Accordingly, the item screen 200 can be displayed while the virtual game is not suspended; however, there may occur inconvenience that the player character 102 is attacked by an enemy character (not shown) during assigning the item 202 to the operating button 60.

In order to avoid such inconvenience, in this embodiment, as described above, the item 112 and the assigning images 114a-114c corresponding to the item 202 that is selected or dragged and the assigning images 204a-204c are displayed on the game screen 100 in a superposed manner, and the item 112 and the assigning images 114a-114c are displayed with a positional relationship corresponding to a positional relationship between the item 202 and the assigning images 204a-204c, whereby the player can perform an operation while seeing the game screen 100. Therefore, the operability can be increased and the player needs to see the item screen 200 only at a time that the item 202 is touched-on (selected), for example, and thus, it is possible to make a time that the user does not see the game screen 100 shorter as much as possible.

Figure 7:
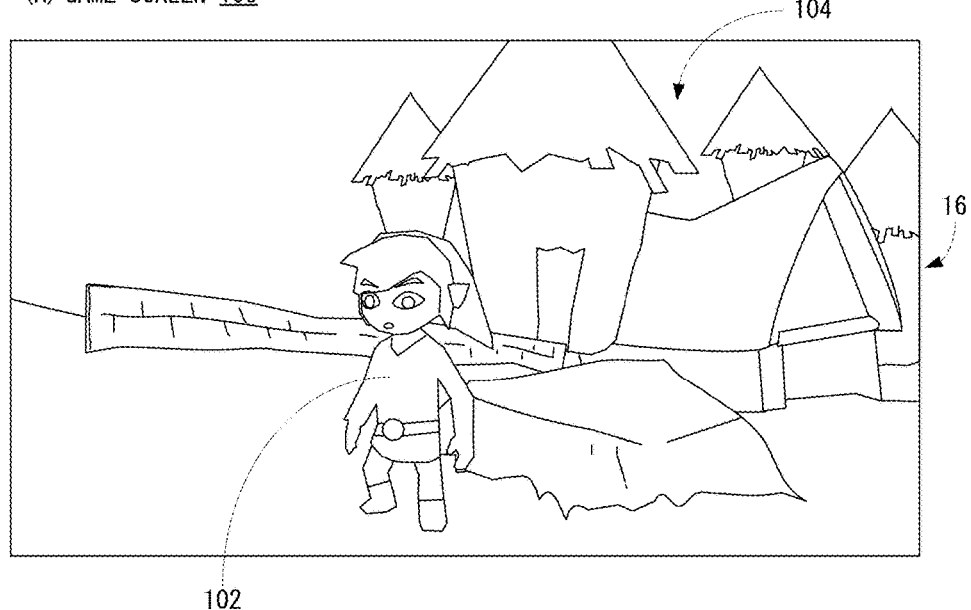
FIG. 7 is a view showing non-limiting fourth examples of the game screen and the item screen.
Figure 7:
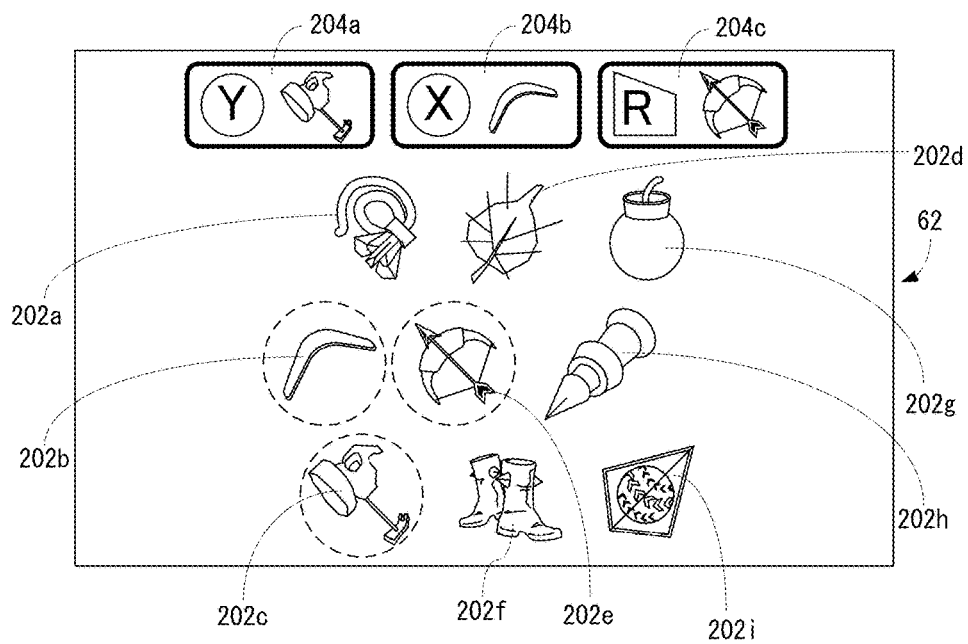

Furthermore, if the item 202c is dragged to a position superposed on the assigning image 204a and then touched-off, the item 202c is assigned to the operating button 60 (here, the Y button) corresponding to the assigning image 204a. Therefore, as shown in FIG. 7(B), an image that the item 202c is reduced in size is displayed in the assigning image 204a and the item 202c is returned to its position, and then, the item 202c becomes to be surrounded by a circular dotted line frame in place of the item 202a. That is, the item 202 to be assigned to the Y button is changed from the item 202a to the item 202c. Furthermore, at a time that the touch-off is performed, as shown in FIG. 7(A), the item 112 and the assigning images 114a-114c are non-displayed on the game screen 100.

The item 202 is thus assigned to the operating button 60 corresponding to either of the assigning images 204a-204c.

In addition, in a case where an operation for assigning the item 202 that has been assigned to the operating button 60 to another operating button 60 is made, the operating button 60 that the item is to be assigned is exchanged between the operating button 60 that the item 202 has been assigned to. In the item screen 200 of FIG. 7(B), for example, if the item 202e is touched and dragged, and then touched-off on the assigning image 204b, the item 202b is assigned to the R button, and the item 202e is assigned to the X button.

Furthermore, in a case where the item 202 that is moved is not superposed on either of the assigning images (204a, 204b, 204c) when the touch-off is performed, the item 202 is not assigned to the operating button 60. If the item 202 that is moved has been assigned to the operating button 60, the assigning to the operating button 60 is not canceled, and thus the operating button 60 that the item 202 is to be assigned to is not changed.

In addition, although illustration is omitted, if the image that the item 202 is reduced in size and displayed to either of the assigning images 204a-204c is touched to be moved on another one of the assigning images 204a-204c, the item 202 can be assigned to the operating button 60 corresponding to the other of the assigning images 204a-204c. That is, it is possible to change the operating button 60 that the item 202 is assigned to. At this time, the item 202 that has been assigned to the operating button 60 corresponding to the assigning images 204a-204c after a movement is assigned to the operating button 60 corresponding to the assigning images 204a-204c before a movement. It is possible to exchange the operating button 60 that the item 202 is assigned to in such a manner. In the item screen 200 of FIG. 7(B), for example, the image being displayed to the assigning image 204b is touched-on and dragged and then touched-off on the assigning image 204a, for example, the item 202b is assigned to the Y button, and the item 202c is assigned to the X button.

Figure 8:
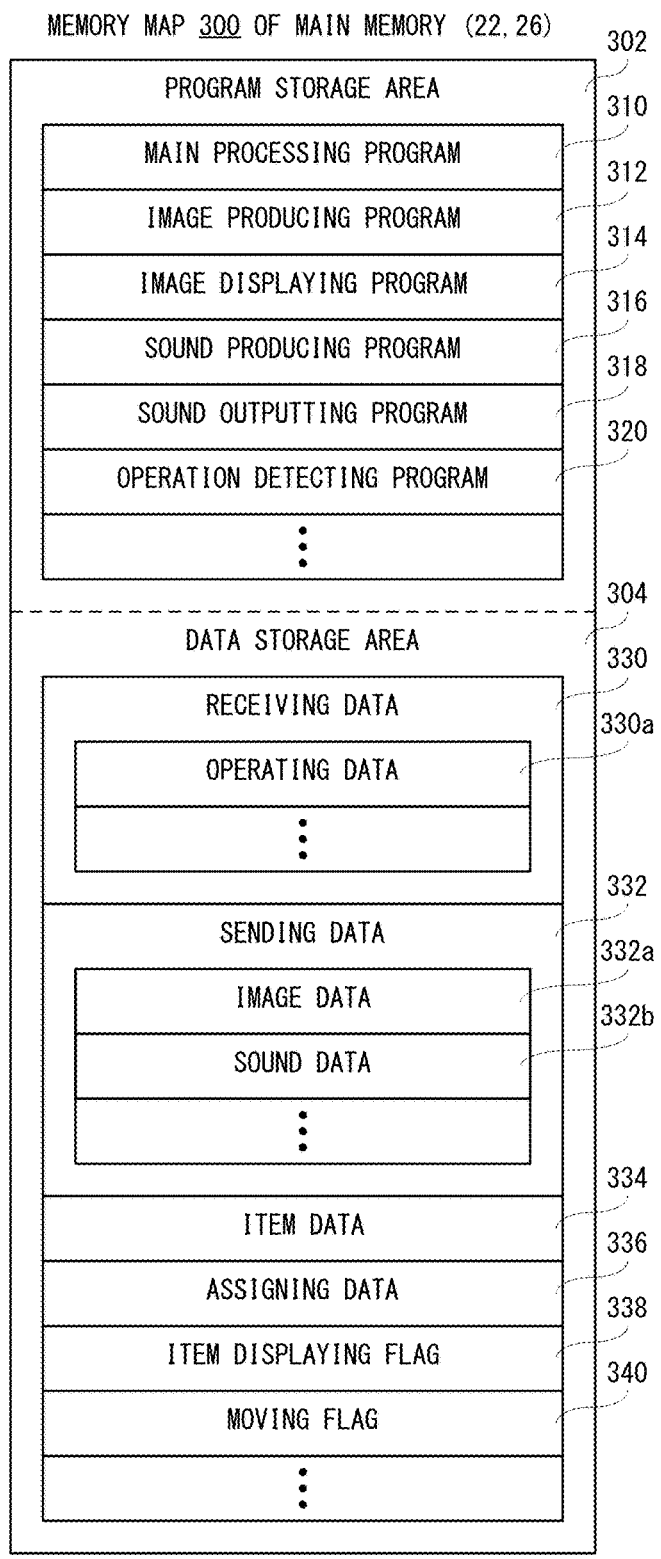
FIG. 8 is a view showing a non-limiting example memory map of a main memory shown in FIG. 2.

FIG. 8 shows an example of a memory map 300 of the main memory (22e, 26) of the game apparatus 12 shown in FIG. 2. As shown in FIG. 8, the main memory (22e, 26) includes a program storage area 302 and a data storage area 304. The program storage area 302 is stored with an information processing program such as a game program. The game program, for example, is partly or wholly read from the optical disk at a suitable timing after the power of the game apparatus 12 is turned-on, to be stored in the main memory (22e, 26).

In addition, the game program may be acquired from the flash memory 24 or an external information processing device of the game apparatus 12 (via the Internet, for example) instead of the optical disk. Furthermore, some programs included in the game program may be stored in advance within the game apparatus 12.

In this embodiment, the game program is constituted by a main processing program 310, an image producing program 312, an image displaying program 314, a sound producing program 316, a sound outputting program 318, an operation detecting program 320, etc.

The main processing program 310 is a program for performing processing of a main routine (entire processing in FIG. 10) of the virtual game. The image producing program 312 is a program for producing the television game image (see FIG. 13) and for producing the terminal game image (see FIG. 14) by using data such as polygon data, texture data, etc.

The image displaying program 314 is a program for outputting image data of the television game image that is produced in accordance with the image producing program 312 to AV-IC 36 thereby displaying the television game image on the television 16. Furthermore, the image displaying program 314 is also a program for sending the image data of the terminal game image that is produced according to the image producing program 312 to the terminal device 14.

The sound producing program 316 is a program for producing, under the control by the CPU 20, producing a television game sound and a terminal game sound by means of the DSP 22c. The sound outputting program 318 is a program for outputting sound data of the television game sound that is produced according to the sound producing program 316 to the AV-IC 36 to cause the television game sound to be output from the speaker 16a. The sound outputting program 318 is also a program for sending sound data of the terminal game sound that is produced according to the sound producing program 316 to the terminal device 14.

The operation detecting program 320 is a program for detecting (receiving) the operating data included in the sending data that is input (sent) from the terminal device 14.

In addition, the program storage area 302 is further stored with a communication program, a backup program, etc.

The data storage area 304 is stored with receiving data 330, sending data 332, item data 334, assigning data 336, etc.

The receiving data 330 is various kinds of data received from the terminal device 14. The receiving data 330 includes operating data 330a. In a case where the terminal device 14 is connected to the game apparatus 12 in a plural number, in correspondence to each of the respective terminal devices 14, the operating data 330a is also stored in a plural number.

The operating data 330a is data representing an operation by the player to the terminal device 14, and as described above, includes operating button data, stick data and touch position data. However, the operating data 330a may be data representing an operation by the player who operates the terminal device 14, and may include any one of the above-described data. The operating data 330a is sent from the terminal device 14 and acquired in the game apparatus 12 to be stored in the main memory (22e, 26).

In addition, in the main memory (22e, 26), the predetermined number of operating data may be stored in an order of the newest data (data acquired at the last) sequentially.

The sending data 332 includes image data 332a, sound data 332b, etc. The image data 332a is produced through the game processing (entire processing, described later), and includes image data of the terminal game image (images of the item screen 200, etc.) output by the terminal device 14 and so on. The sound data 332b is produced through the game processing, and includes sound data of the terminal game sound output by the terminal device 14.

The item data 334 is data for an item that is possessed by the player character 102. The item data 334 includes identifying information for identifying a kind of the item 202 that is possessed by the player character 102 and number-of-piece information indicative of the number of the items 202 being possessed, for example. The assigning data 336 is data for the item 202 that is assigned to the operating button 60. The assigning data 336 is data that the identifying information of the item 202 being assigned is described corresponding to the identifying information of the operating button 60, for example.

Furthermore, the data storage area 304 is provided with an item displaying flag 338 and a moving flag 340.

The item displaying flag 338 is a flag for determining whether the item screen 200 is being displayed on the terminal device 14, and being constructed by a 1-bit register. In a case where the item screen 200 is being displayed on the terminal device 14, the item displaying flag 338 is turned-on and thus a data value "1" is set in the register. In a case where the item screen 200 is not being displayed on the terminal device 14, the item displaying flag 338 is turned-off and thus a data value "0" is set in the register.

The moving flag 340 is a flag for determining whether the item 202 is moved in the item screen 200, and being constructed by a 1-bit register. In a case where the item 202 is moved, the moving flag 340 is turned-on and thus a data value "1" is set in the register. In a case where the item 202 is not moved, the moving flag 340 is turned-off and thus a data value "0" is set in the register. In addition, in this embodiment, the case where the item 202 is being moved means a time period from a time that the item 202 is touched-on (selected) and to a time that the item 202 is touched-off (selection cancel or movement stop).

Although not shown, the data storage area 304 is stored with other data such as sound data and sound wave-form data, and provided with other flags and counters (timers). In addition, the data utilized in the entire game processing includes various kinds of data utilized in the game processing such as data representing various kinds of parameters set to various kinds of characters or objects appearing in the virtual game.

Figure 9:
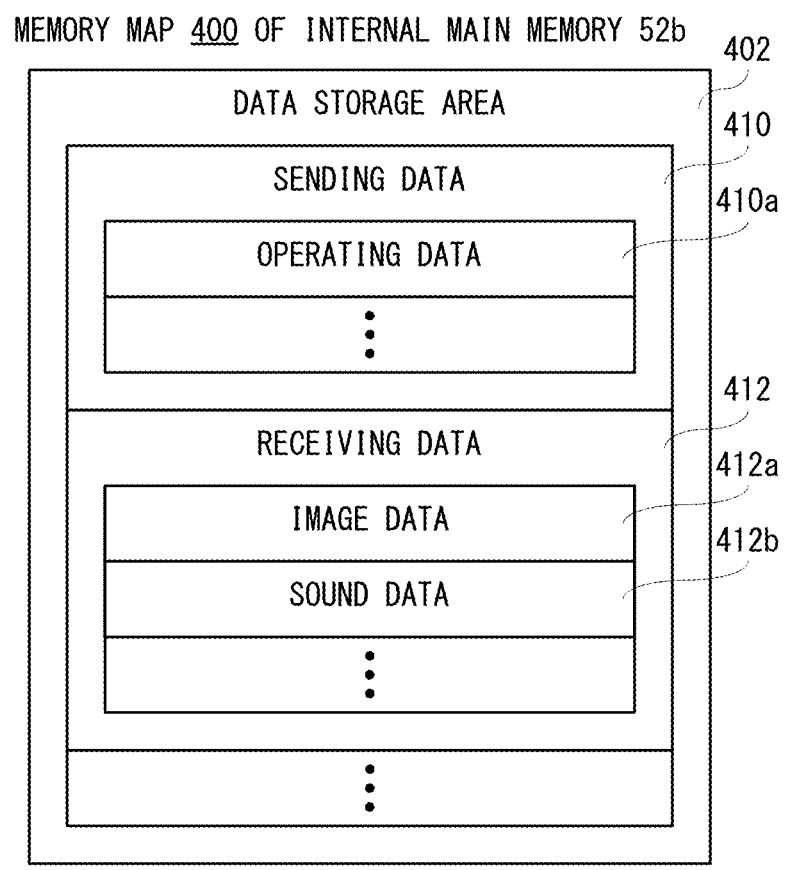
FIG. 9 is a view showing a non-limiting example memory map of an internal memory shown in FIG. 3.

FIG. 9 shows an example of a memory map 400 of the internal memory 52b of the terminal device 14 shown in FIG. 3. As shown in FIG. 9, the internal memory 52b includes a data storage area 402.

The data storage area 402 is stored with the sending data 410 and the receiving data 412.

The sending data 410 includes the operating data 410a. Since the operating data 410a has the same content as that of the operating data 330a included in the above-described receiving data 330, a duplicate description is omitted here.

The receiving data 412 includes image data 412a, sound data 412b, etc. Since these have the same contents as the image data 332a and the sound data 332b included in the above-described sending data 332, a duplicate description is omitted here.

Although not shown, the data storage area 402 may be stored with other data necessary for operation of the terminal device 14, and is provided with other flags and counters (timers).

Figure 10:
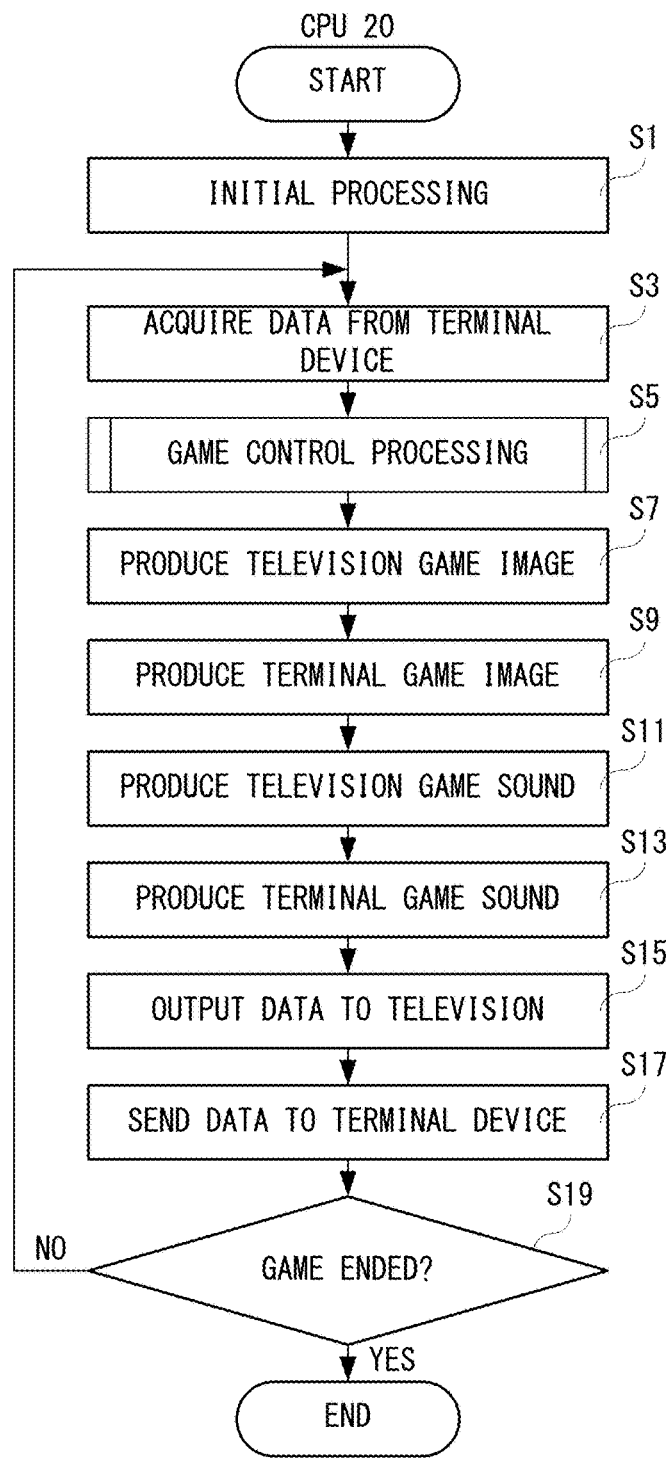
FIG. 10 is a flowchart showing a non-limiting example entire processing by a CPU of the game apparatus shown in FIG. 2.

FIG. 10 is a flowchart for the entire game processing by the CPU 20 provided in the game apparatus 12 shown in FIG. 2. In addition, the processing in respective steps of the flowchart shown in FIG. 10 (similar to FIG. 11 to FIG. 14, described later) are only examples, and therefore, as far as the same or similar results are obtained, a processing order of the respective steps may be exchanged. Furthermore, this embodiment is described on an assumption that the processing of the respective steps in flowcharts shown in FIG. 10 to FIG. 14 are performed by the CPU 20 basically; however, a part of the steps may be performed by a processor(s) and a dedicated circuit(s) other than the CPU 20.

If the power of the game apparatus 12 is turned-on, prior to performing the entire processing, the CPU 20 executes an activating program stored in a boot ROM not shown, whereby respective units such as the main memory (22e, 26), etc. can be initialized. Then, the game program stored in the optical disk is read in the main memory (22e, 26), thereby to start an execution of the game program 410 by the CPU 20.

When the entire processing is started, the CPU 20 performs initial processing at a step S1 that is processing for building-up a virtual game space for producing and displaying the game screen 100, arranging respective characters or objects such as the player character 102, etc. that appear in the game space at their initial positions. Furthermore, the CPU 10 builds-up a further virtual game space for producing and displaying the item screen 200, arranging respective characters or objects such as the item 202 that appear in this game space at predetermined positions. The CPU 10 also builds-up the other virtual game space for producing and displaying the map screen, arranging respective characters or objects such as landscape objects that appear in this game space at predetermined positions. Furthermore, in the initial processing, the CPU 10 sets initial values of various kinds of parameters used in the game processing.

Subsequently, in a step S3, the CPU 20 acquires various kinds of data sent from the terminal device 14, and in a step S5, the CPU 20 performs game control processing (see FIG. 11 and FIG. 12) described later.

Figure 13:
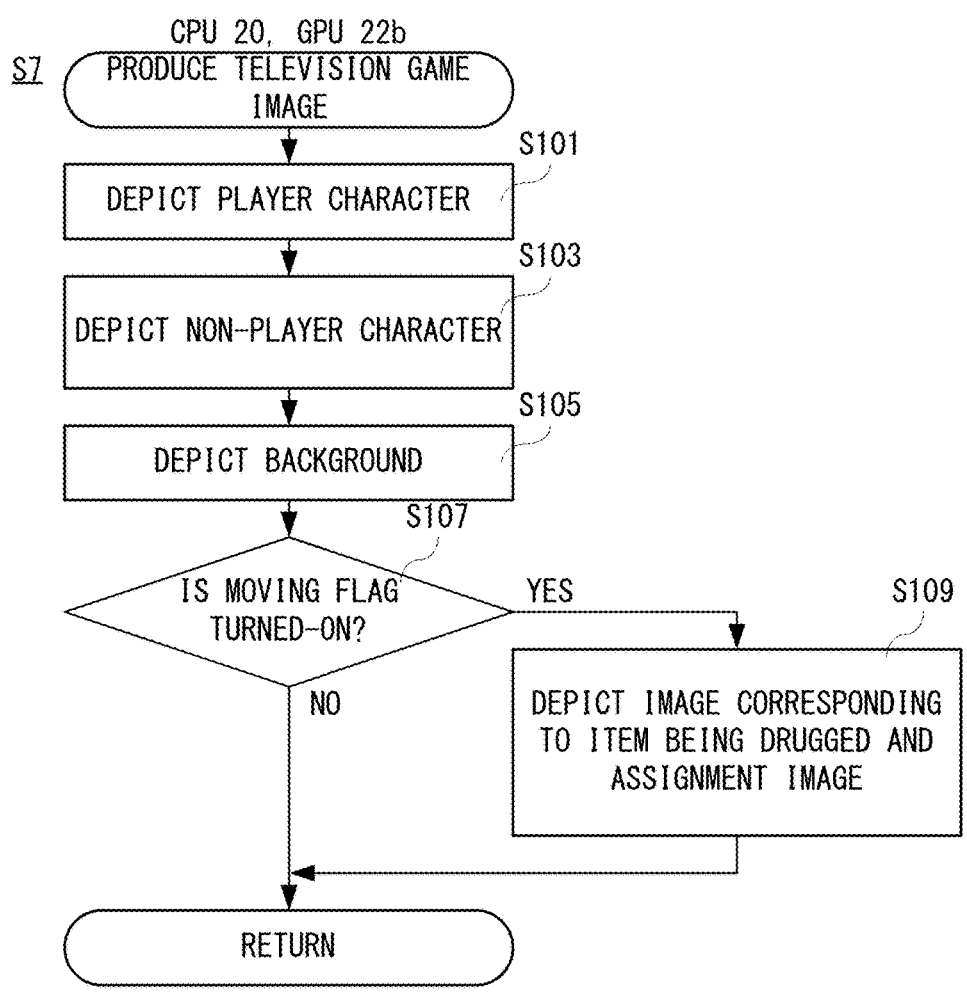
FIG. 13 is a flowchart showing a non-limiting example television game image producing processing by the CPU and a GPU of the game apparatus shown in FIG. 2.

In a next step S7, the CPU 20 and the GPU 22b perform producing processing of the television game image for being displayed on the television 16 (see FIG. 13). Briefly described, the CPU 20 and the GPU 22b read data representative of a result of the game control processing in the step S5 from the main memory (22e, 26), and read data necessary for producing the game image from the VRAM 22d to thereby produce the television game image.

Figure 14:
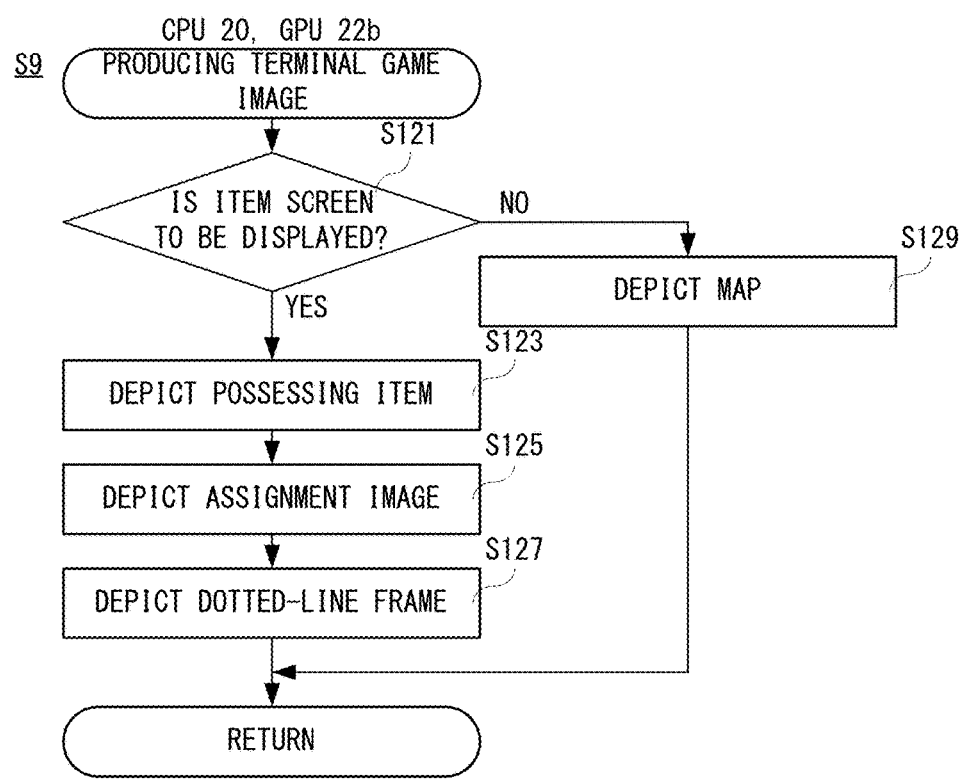
FIG. 14 is a flowchart showing a non-limiting example terminal game image producing processing by the CPU and the GPU of the game apparatus shown in FIG. 2.

In a next step S9, the CPU 20 and the GPU 22b perform producing processing of the terminal game image for displaying on the terminal device 14 (see FIG. 14). Briefly described, as similar to the above-described television game image, the terminal game image is also produced by reading data representative of a result of the game control processing in the step S5 from the main memory (22e, 26), and reading data necessary for producing the game image from the VRAM 22d.

Subsequently, in a step S11, the CPU 20 produces the television game sound for being output to the speaker 16a of the television 16. That is, the CPU 20 causes the DSP 22c to produce a game sound according to the result of the game control processing in the step S5.

The CPU 20 produces the terminal game sound to be output to the speaker 66 of the terminal device 14 in a step S13. That is, the CPU 20 causes the DSP 22c to produce a game sound according to the result of the game control processing in the step S5.

However, if the television game sound and the terminal game sound are coincident with each other, the processing in the step S11 or S13 may not be performed.

Subsequently, in a step S15, the CPU 20 outputs data to the television 16. Specifically, the CPU 20 sends to the AV-IC 36 the image data for the television game image stored in the VRAM 22d and the sound data for the television game sound produced by the DSP 22c in the step S11.

Next, in a step S17, the CPU 20 sends data to the terminal device 14. Specifically, the image data for the terminal game image that is stored in the VRAM 22d and the sound data for the terminal game sound that is produced by the DSP 22c in the step S13 are sent to the codec LSI 52 by the CPU 20 so as to be subjected to the predetermined compression processing by the codec LSI 52. Then, data of the image and the sound subjected to the compression processing is sent to the terminal device 14 by the terminal communication module 32 via the antenna 34. The terminal device 14 receives the data of the image and the sound sent from the game apparatus 12 by the wireless module 70, whereby the predetermined expansion processing is performed on the data of the image and the sound by the codec LSI 52. The image data being performed with the expansion processing is output to the LCD 62 and the sound data being performed with the expansion processing is output to the sound IC 64.

Then, in a step S19, the CPU 20 determines whether the game is to be ended. Determination in the step S19 is performed by determining whether the game is made over or whether the player inputs an instruction to stop the game, for example. The determination on whether the game is made over is performed by determining the vital value of the player character 102 becomes zero (0), for example.

If "NO" is determined in the step S19, that is, if the game is not to be ended, the process returns to the step S3. On the other hand, if "YES" is determined in the step S19, that is, if the game is to be ended, the entire processing is terminated.

Figure 11:
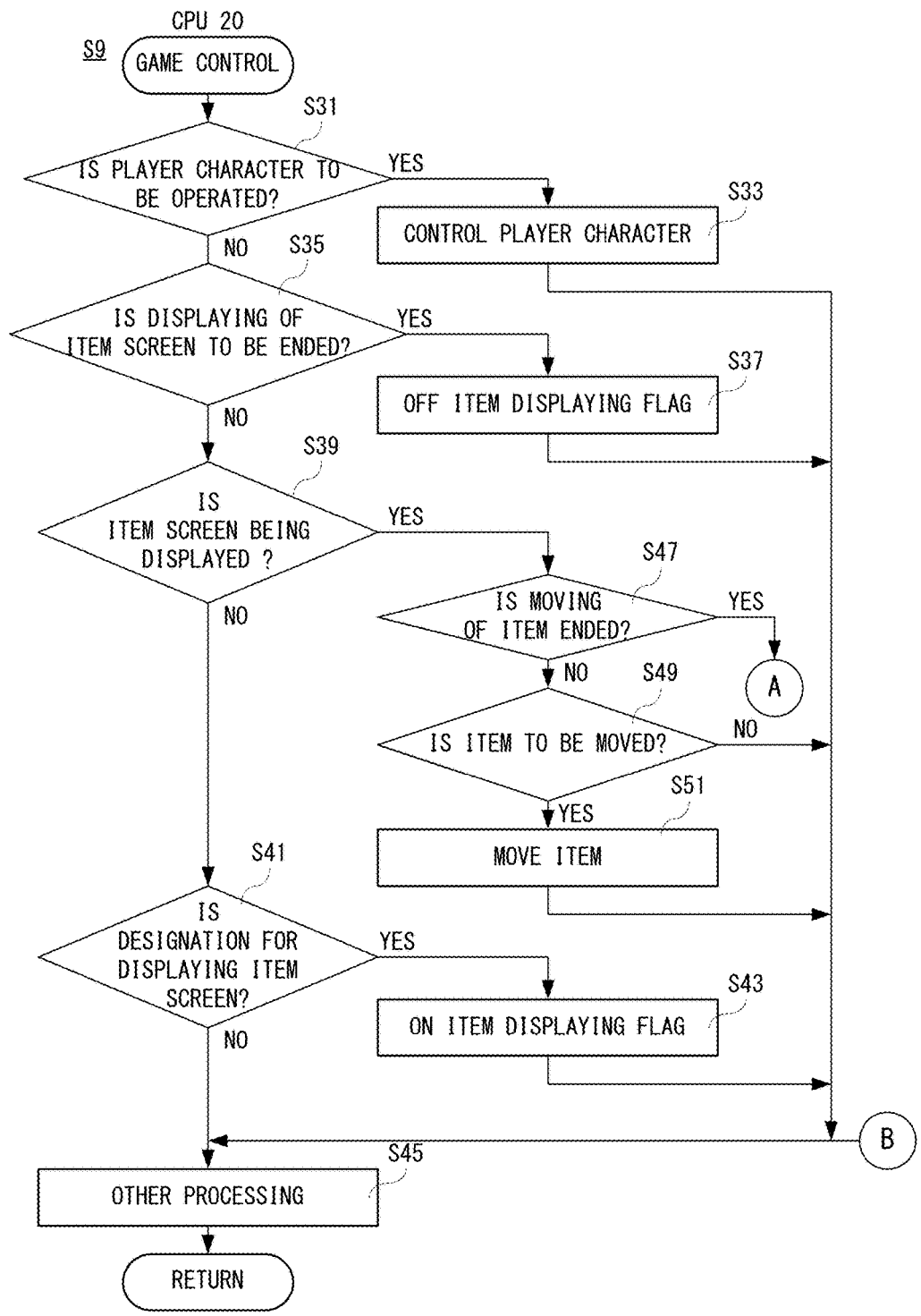
FIG. 11 is a flowchart showing a non-limiting example part of game control processing by the CPU of the game apparatus shown in FIG. 2.
Figure 12:
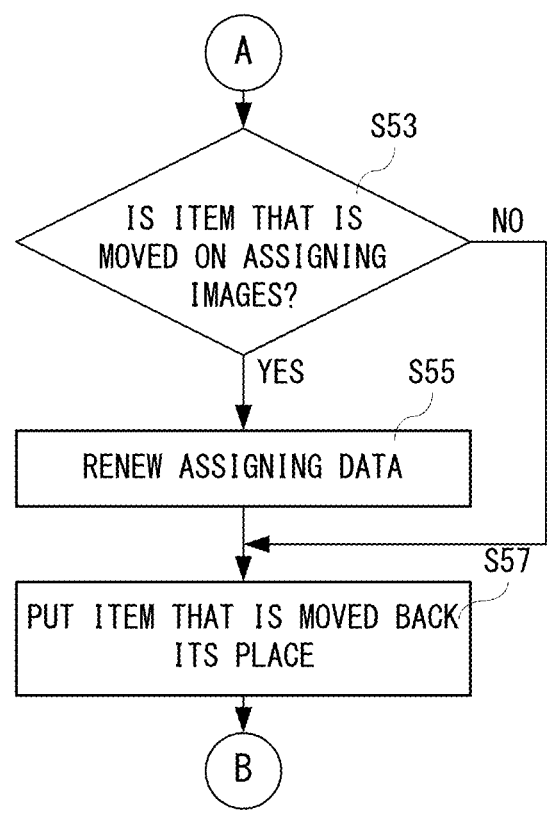
FIG. 12 is a flowchart showing a non-limiting example further part of game control processing by the CPU of the game apparatus shown in FIG. 2.

FIG. 11 and FIG. 12 are a flowchart showing the game control processing in the step S5 shown in FIG. 10. As shown in FIG. 11, when the game control processing is started, the CPU 20 determines whether an operation for the player character 102 is made in a step S31. Here, the CPU 20 determines whether the analog stick 58 or the operating button 60 is operated so as to move the player character 102 or make the player character 102 attack or make the player character 102 use the item 202 with referring to the operating data 330a included in the receiving data 330.

If "YES" is determined in the step S31, that is, if the operation for the player character 102 is made, a movement or the like of the player character 102 is controlled according to the operation in a step S33, and then, the process proceeds to a step S45. On the other hand, if "NO" is determined in the step S31, that is, if the operation for the player character 102 is not made, in a step S35, it is determined whether the displaying of the item screen 200 is to be ended. Here, the CPU 20 determines whether there is instructed that the map screen is to be displayed on the terminal device 14. In this embodiment, during the play of the virtual game, that is, during the performance of the entire processing, the item screen 200 and the map screen can be switchedly displayed on the LCD 62 of the terminal device 14, and accordingly, in the step S35, it is determined whether the displaying of the map screen is instructed.

If "YES" is determined in the step S35, that is, if the displaying of the item screen 200 is to be ended, the item displaying flag 338 is turned-off in a step S37, and then, the process proceeds to the step S45. On the other hand, if "NO" is determined in the step S35, that is, if the displaying of the item screen 200 is not to be ended, in a step S39, it is determined whether the item screen 200 is being displayed. Here, the CPU 20 determines whether the item displaying flag 338 is turned-on.

If "NO" is determined in the step S39, that is, if the item screen 200 is not being displayed, in a step S41, it is determined whether the displaying of the item screen 200 is instructed. If "YES" is determined in the step S41, that is, if the item screen 200 is instructed to be displayed, the item displaying flag 338 is turned-on in a step S43, and then, the process proceeds to the step S45. On the other hand, if "NO" is determined in the step S41, that is, if the displaying of the item screen 200 is not instructed, the process proceeds to the step S45 with no operation so as to perform other processing, and then, the process returns to the entire processing shown in FIG. 10. The other processing is processing that movement and action of a villager character or an enemy character is controlled, or processing that a game clear or a game over is determined, or processing for making an item appear, for example.

If "YES" is determined in the step S39, that is, if the item screen 200 is being displayed, in a step S47, it is determined whether a movement of the item 202 is to be ended. Here, the CPU 20 determines whether the moving flag 340 is changed from its on state to an off state. Although not shown, in parallel with the entire processing, processing for determining, based on touch position data that is acquired (received), whether the item 202 is being touched is performed. Through such the processing, the moving flag 340 is turned-on/off.

If "NO" is determined in the step S47, that is, if the movement of the item 202 is not to be ended, in a step S49, it is determined whether the item 202 is to be moved. Here, the CPU 20 determines whether a touch position that is indicated by touch position data is changed.

If "NO" is determined in the step S49, that is, if the item 202 is not to be moved, the process proceeds to the step S45. On the other hand, if "YES" is determined in the step S49, that is, if the item 202 is to be moved, the item 202 is moved in a step S51. Here, the CPU 20 renews a position of the item 202 according to a touch position.

If "YES" is determined in the step S47, that is, if the movement of the item 202 is to be ended, in a step S53 shown in FIG. 12, it is determined whether the item 202 that is moved is on either of the assigning images (204a, 204b, 204c).

If "NO" is determined in the step S53, that is, if the item 202 that is moved is not on either of the assigning images (204a, 204b, 204c), the process proceeds to a step S57 with no operation. On the other hand, if "YES" is determined in the step S53, that is, if the item 202 that is moved is on either of the assigning images (204a, 204b, 204c), the assigning data 336 is renewed in a step S55, and then, the process proceeds to the step S57. A method for assigning the item 202 to the operating button 60 is as above-described, and in the step S55, according to a result that the item 202 is assigned to the operating button 60, the assigning data 336 is rewritten. In the step S57, the item 202 that is moved is returned to its position, and the process proceeds to the step S45 shown in FIG. 11.

FIG. 13 is a flowchart for producing processing of the television game image in the step S7 shown in FIG. 10. As shown in FIG. 13, when the producing processing is started, the CPU 20 and the GPU 22b depict the player character 102 at a current position in the game space in a step S101, and depict a non-player character such as a villager character or an enemy character in a step S103. Furthermore, in a step S105, a background according to the current position of the player character 102 is depicted. Then, in a step S107, it is determined whether the moving flag 340 is turned-on. If "NO" is determined in the step S107, that is, if the moving flag 340 is turned-off, the process returns to the entire processing with no operation. On the other hand, if "YES" is determined in the step S107, that is, if the moving flag 340 is turned-on, images corresponding to the item 202 that is selected or dragged and the assigning images 204a-204c, that is, the item 112 and the assigning images 114a-114c are depicted in a step S109, and then, the process returns to the entire processing. In the step S109, in a manner superposed on the player character 102, the non-player character and the background image 104, the item 112 and the assigning images 114a-114c that are semitransparent are depicted with a positional relationship corresponding to a positional relationship between the item 202 that is selected or dragged and the assigning images 204a-204c. In addition, the assigning images 114a-114c are depicted to be displayed at a predetermined position, and the item 112 is depicted to be displayed at a position corresponding to a touch position that is indicated by the touch position data.

FIG. 14 is a flowchart of producing processing of the terminal game image in the step S9 shown in FIG. 10. As shown in FIG. 14, when the producing processing is started, in a step S121, the CPU 20 determines whether the item screen 200 is to be displayed. Here, the CPU 20 determines whether the item displaying flag 338 is turned-on. If "YES" is determined in the step S121, that is, if the item screen 200 is to be displayed, the possessed item (items 202a-202i) is depicted in a step S123, and in a step S125, the assigning images 204a-204c are depicted. The possessed item is depicted such that the same is displayed with a predetermined positional relationship with the assigning images 204a-204c. In addition, the item 202 that is dragged is depicted so as to be displayed at a position corresponding to the touch position shown by the touch position data. Then, in a step S127, a circular dotted line frame corresponding to the item 202 that is assigned to the operating button 60 is depicted, and then, the process returns to the entire processing. On the other hand, if "NO" is determined in the step S121, that is, if the map screen is to be displayed, the map is depicted in a step S129, and then, the process returns to the entire processing.

According to this embodiment, in a case where the game screen is displayed on the television, the item screen is displayed on the terminal device and the item is assigned to the operating button in the item screen, if the item is touched, images corresponding to the item that is touched and the assigning images are displayed in a superposed manner on the game screen, and accordingly, if the operation for assigning the item is to be performed, such an operation can be performed while seeing the game screen. That is, the item can be assigned to the operating button while the virtual game is not suspended and the game screen is being confirmed. Therefore, the operability can be increased.

Furthermore, in this embodiment, since the item and the assigning images are displayed on the game screen with a positional relationship corresponding to a positional relationship between the item and the assigning images that are displayed on the terminal device, even in a case where the player is seeing the game screen, the item can be operated as if the item is operated while seeing the item screen.

In addition, in this embodiment, although the terminal device is provided with the analog stick and the operating button for performing the game operation except for the operation that the item is assigned to the operating button and the touch panel for performing the touch operation that is for assigning the item to the operating button, it is not necessary to be limited to this. A controller provided with an operating button may be provided separately from the terminal device provided with the touch panel, for example.

In this embodiment, the item is moved by the drag, but not limited to this, and the item can be also moved by a flick. The flick means an operation that a screen surface is slightly brushed by a finger or the like, and a distance that the finger or the like is slid is shorter than that of the drag.

In such a case, the item is touched-on, and then, the item is flicked toward either of the assigning images corresponding to the operating button that the player wishes to assign the item to. Then, the item is moved in a direction that the flick is performed with an initial velocity according to a speed of the flick, and slowed-down with a predetermined acceleration reversed with the moving direction. If the item reaches the assigning image, the item is assigned to the operating button corresponding to the assigning image that the item reaches. If the item that is moved by the flick does not reach the assigning image, the item is not assigned to the operating button and returns its position. This is similar to a case that, when the item that is dragged is touched-off, the item is not superposed on either of the assigning images.

In addition, a game system shown in the above-described embodiment is only an example, and it is possible to adopt other structure as far as the structure that the game screen and the item screen are displayed on separate display devices is employed. For example, the embodiment can be applied to a portable game apparatus that is provided with two displays. Furthermore, the embodiment can be also applied to a system that is provided with a personal computer or a notebook personal computer that is connected with a monitor and a tablet PC or a smart phone that can communicate with the personal computer or the notebook personal computer.

In the above-described embodiment, the terminal game image and the terminal game sound are produced by the game apparatus; however, the same may be produced on the terminal device.

The systems, devices and apparatuses described herein may include one or more processors that may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and that communicates remotely (e.g., wirelessly) with the movable display; or a processor that is part of or is a separate component co-located with the movable display and communicates remotely (e.g., wirelessly) with the stationary display or associated equipment; or a distributed processing arrangement some of that is contained within the movable display housing and some of that is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-described ASICs (application specific integrated circuits) and/or logic circuitry. In the case of a distributed processor architecture of arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, that are co-located or remotely located with respect to each other.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing apparatus, comprising:
    a first displaying unit operable to display at least one first object that is a selecting target on a first screen and that is displayed on a portable type display device;
    a first determining unit operable to determine whether the first object is selected; and
    a second displaying unit operable to display, upon determining by the first determining unit that the first object is selected by user input operation on the portable type display device, a second object corresponding to the selected first object in a superposed manner on a second screen that is different from the first screen.

2. The information processing apparatus according to claim 1, further comprising:
    a first receiving unit operable to receive a moving operation, as the user input operation on the portable type display device, for the first object that is selected; and
    a moving unit operable to move the first object in accordance with the moving operation and move the second object as similar to the first object at a time that the moving operation is received by the first receiving unit.

3. The information processing apparatus according to claim 2, further comprising:
    a second receiving unit operable to receive an operating input with respect to the second screen; and
    a performing unit operable to perform information processing in accordance with the operating input that is received by the second receiving unit.

4. The information processing apparatus according to claim 3, further comprising a pointing device and an input device of a type different from the pointing device, wherein
the first receiving unit is operable to receive the moving operation using the pointing device and the second receiving unit is operable to receive an operating input using the input device.

5. The information processing apparatus according to claim 4, wherein
the pointing device is a touch panel and the input device is a button input device.

6. The information processing apparatus according to claim 2, wherein
the moving operation includes a slide operation as the user input operation on the portable type display device.

7. The information processing apparatus according to claim 1, wherein
the first determining unit is operable to further determine whether a selection of the first object is canceled, and
the second displaying unit is operable to non-display the second object on the second screen upon determining, by the first determining unit, that the selection of the first object is canceled.

8. The information processing apparatus according to claim 7, further comprising a second determining unit operable to determine whether the first object comes to rest when it is determined by the first determining unit that the selection of the first object is canceled, wherein
the second displaying unit is operable to non-display the second object on the second screen upon determining, by the second determining unit, that the first object comes to rest.

9. The information processing apparatus according to claim 1, wherein
the first displaying unit is operable to further display a first moving destination object that is a moving destination of the first object, and
the second displaying unit is operable to further display a second moving destination object corresponding to the first moving destination object in a superposed manner on the second screen.

10. The information processing apparatus according to claim 9, wherein
the second displaying unit is operable to display the second object and the second moving destination object in a superposed manner on the second screen with a positional relationship in accordance with a positional relationship between the first object and the first moving destination object that are displayed on the first screen.

11. The information processing apparatus according to claim 9, wherein
the second displaying unit is operable to non-display the second object and the second moving destination object upon moving the first object that is selected to the first moving destination object.

12. The information processing apparatus according to claim 9, wherein
the second displaying unit is operable to display the second object and the second moving destination object in a semitransparent manner.

13. The information processing apparatus according to claim 1, wherein
the first screen and the second screen are screens that depict spaces different from each other.

14. The information processing apparatus according to claim 1, wherein
the first screen is a screen for selecting the first object by the user input operation on the portable type display device, and the second screen is an information processing screen capable of representing at least a manner how the first object is used.

15. The information processing apparatus according to claim 1, wherein
the first screen is displayed on a portable type display device, and the second screen is a further display device that is separated from the portable type display device.

16. The information processing apparatus according to claim 1, wherein the second display is configured to not display the second object on the second screen when a determination is made that the first object is not being selected by user input operation on the first display device.

17. An information processing system, comprising: a computer processor and memory, the processing system being configured at least to:
generate a first display of at least one first object that is a selecting target on a first screen and that is displayed on a portable type display device;
determine whether the first object is selected; and
generate a second display of, upon determination that the first object is selected by user input operation on the portable display device, a second object corresponding to the selected first object in a superposed manner on a second screen that is different from the first screen.

18. The information processing system according to claim 17, wherein the second displaying unit operable to not display the second object on the second screen when a determination is made that the first object is not being selected by the user input operation on the portable type display device.

19. A non-transitory computer readable storage medium storing an information processing program executable by at least one computer of an information processing system comprising a first display device and a second display device that are different from each other, wherein the information processing program causes the at least one computer at least to:
display at least one first object that is a selecting target displayed on the first display device, the first display device being a portable type display device;
determine whether the first object is selected; and
display, upon determining that the first object is selected by user input operation on the first display device, a second object corresponding to the selected first object in a superposed manner on the second display device.

20. The non-transitory computer readable storage medium according to claim 19, wherein the information processing program further causes the at least one computer at least to:
not display the second object on the second display device when a determination is made that the first object is not being selected by the user input operation on the first display device.

21. An information processing method performed by at least one computer of an information processing system comprising a first display device and a second display device that are different from each other, comprising steps of:
(a) displaying at least one first object that is a selecting target displayed on the first display device, the first display device being a portable type display device;
(b) determining whether the first object is selected; and
(c) displaying, upon determining in the step (b) that the first object is selected by user input operation on the first display device, a second object corresponding to the selected first object in a superposed manner on the second display device.

22. The information processing method according to claim 21, further comprising not displaying the second object on the second display device when a determination is made that the first object is not being selected by the user input operation on the first display device.

* * * * *